March 17, 1936. W. C. WRIGHT 2,034,454
SLICKING MACHINE
Original Filed April 13, 1929 16 Sheets-Sheet 1

Inventor
Wallace C. Wright
by James R. Hodder
Attorney

March 17, 1936. W. C. WRIGHT 2,034,454
SLICKING MACHINE
Original Filed April 13, 1929 16 Sheets-Sheet 3

Inventor
Wallace C. Wright
By James R. Hodder
Attorney

March 17, 1936.　　　W. C. WRIGHT　　　2,034,454
SLICKING MACHINE
Original Filed April 13, 1929　　16 Sheets-Sheet 4

March 17, 1936.  W. C. WRIGHT  2,034,454
SLICKING MACHINE
Original Filed April 13, 1929  16 Sheets-Sheet 5

Inventor
Wallace C. Wright
by James R. Hoddes
Attorney

March 17, 1936.  W. C. WRIGHT  2,034,454
SLICKING MACHINE
Original Filed April 13, 1929  16 Sheets-Sheet 6
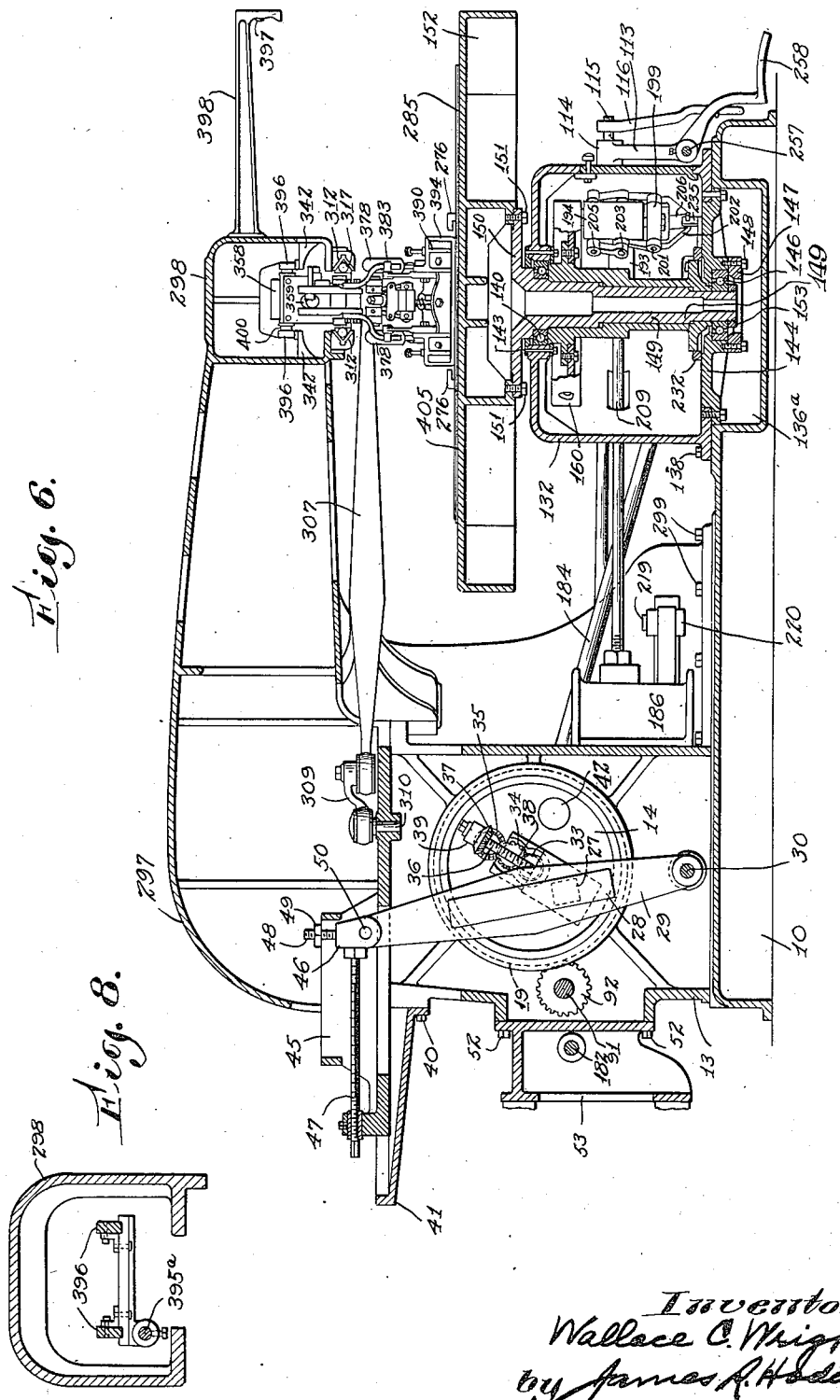
Inventor
Wallace C. Wright
by James R. Hodder
Attorney

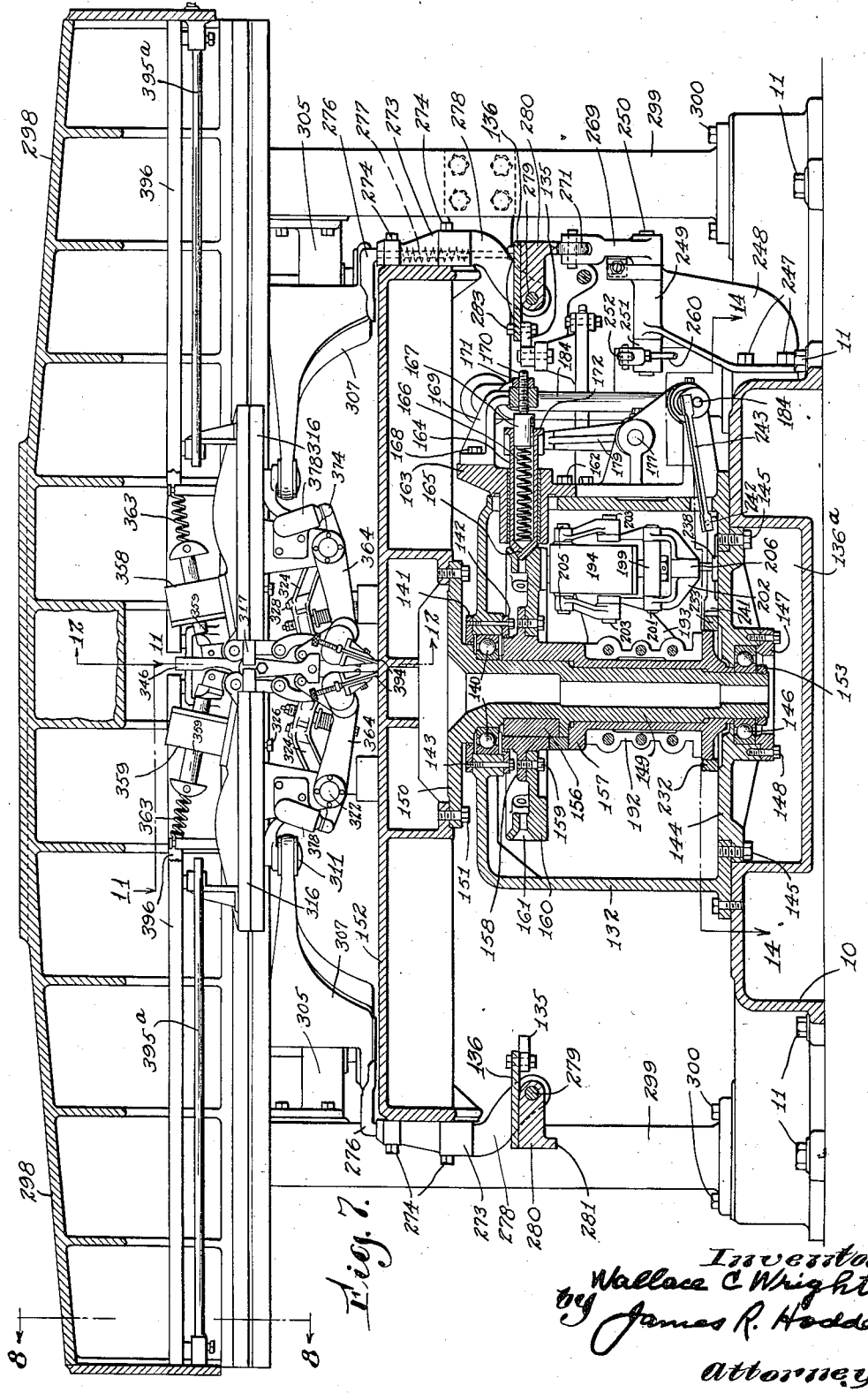

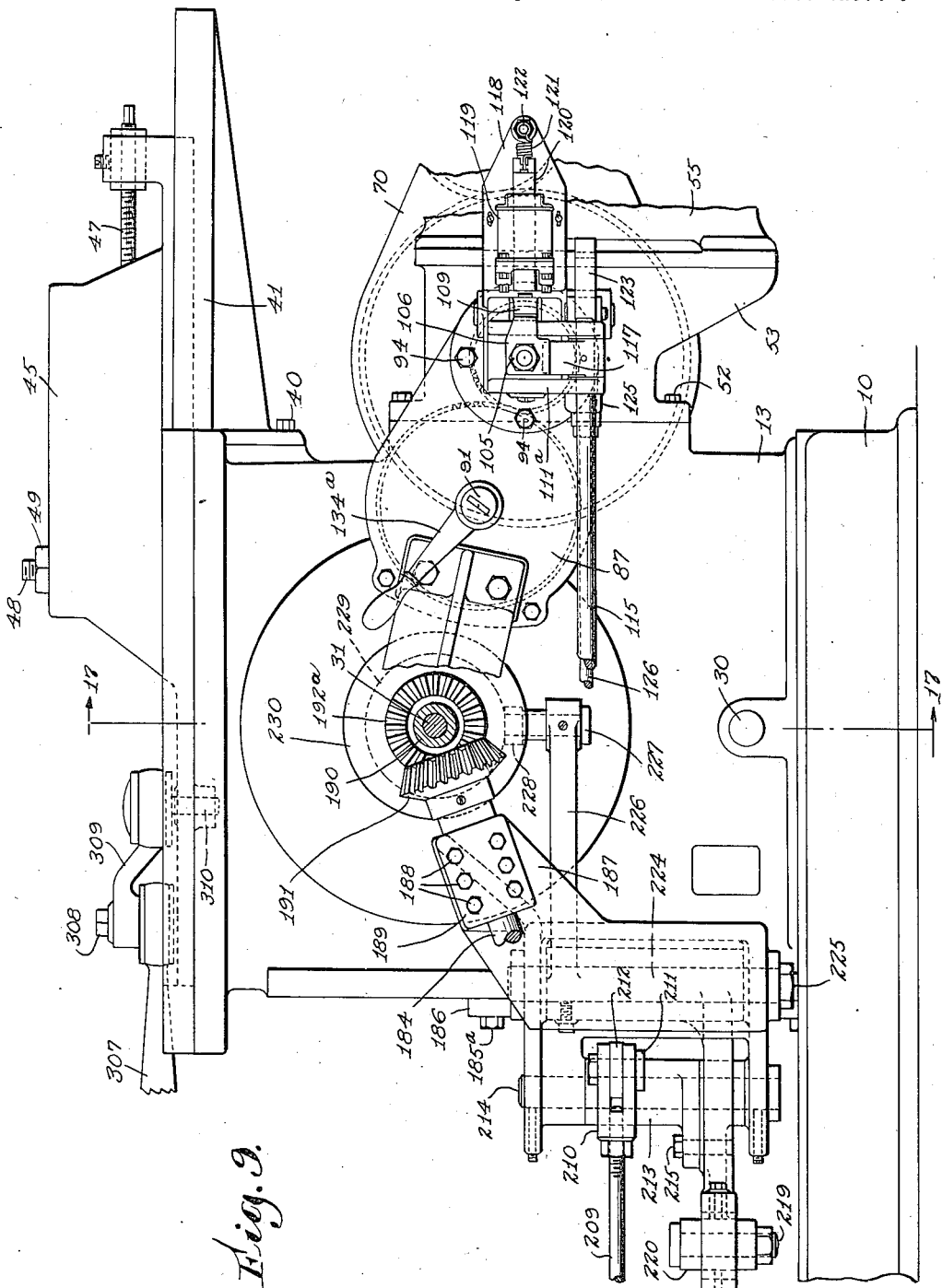

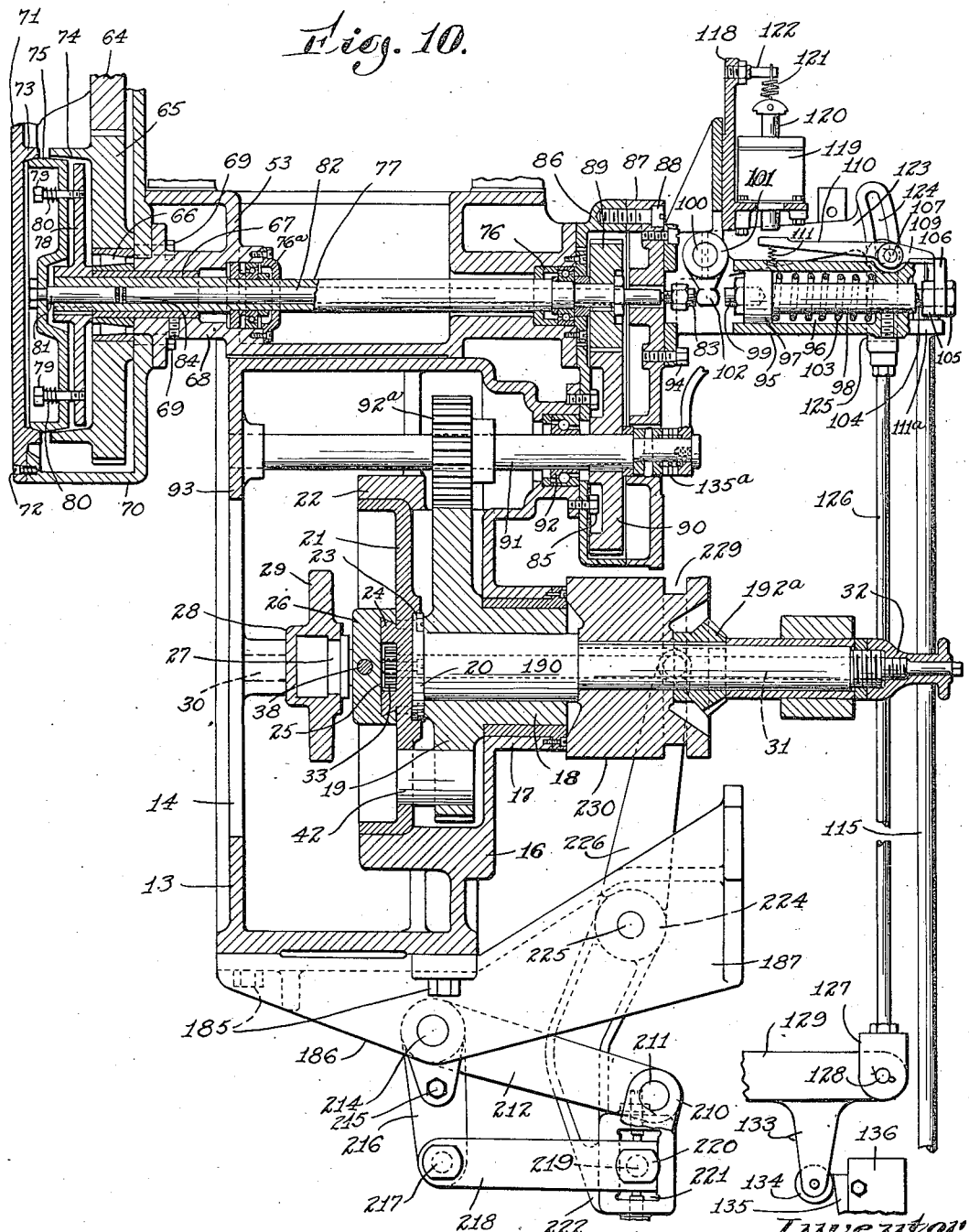

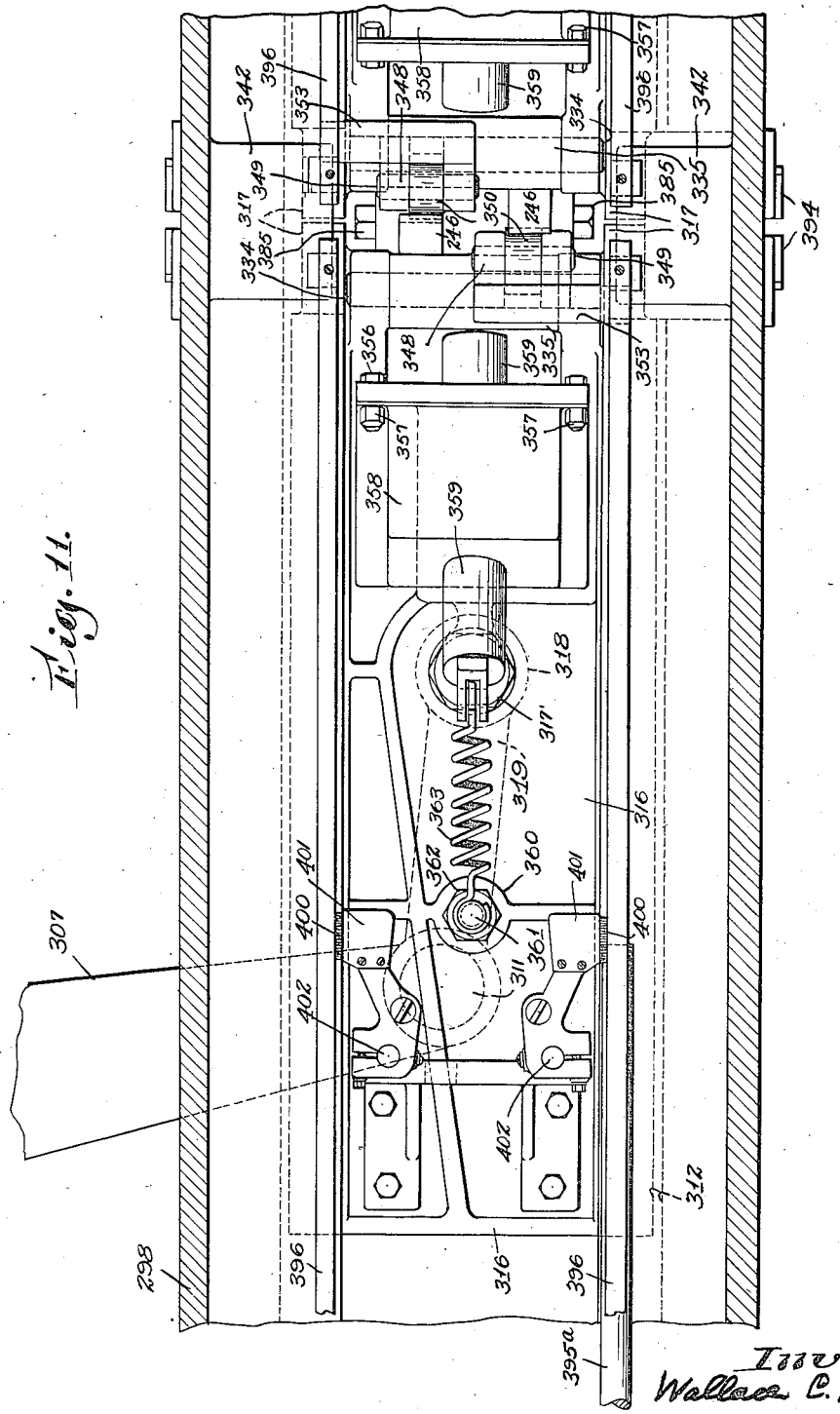

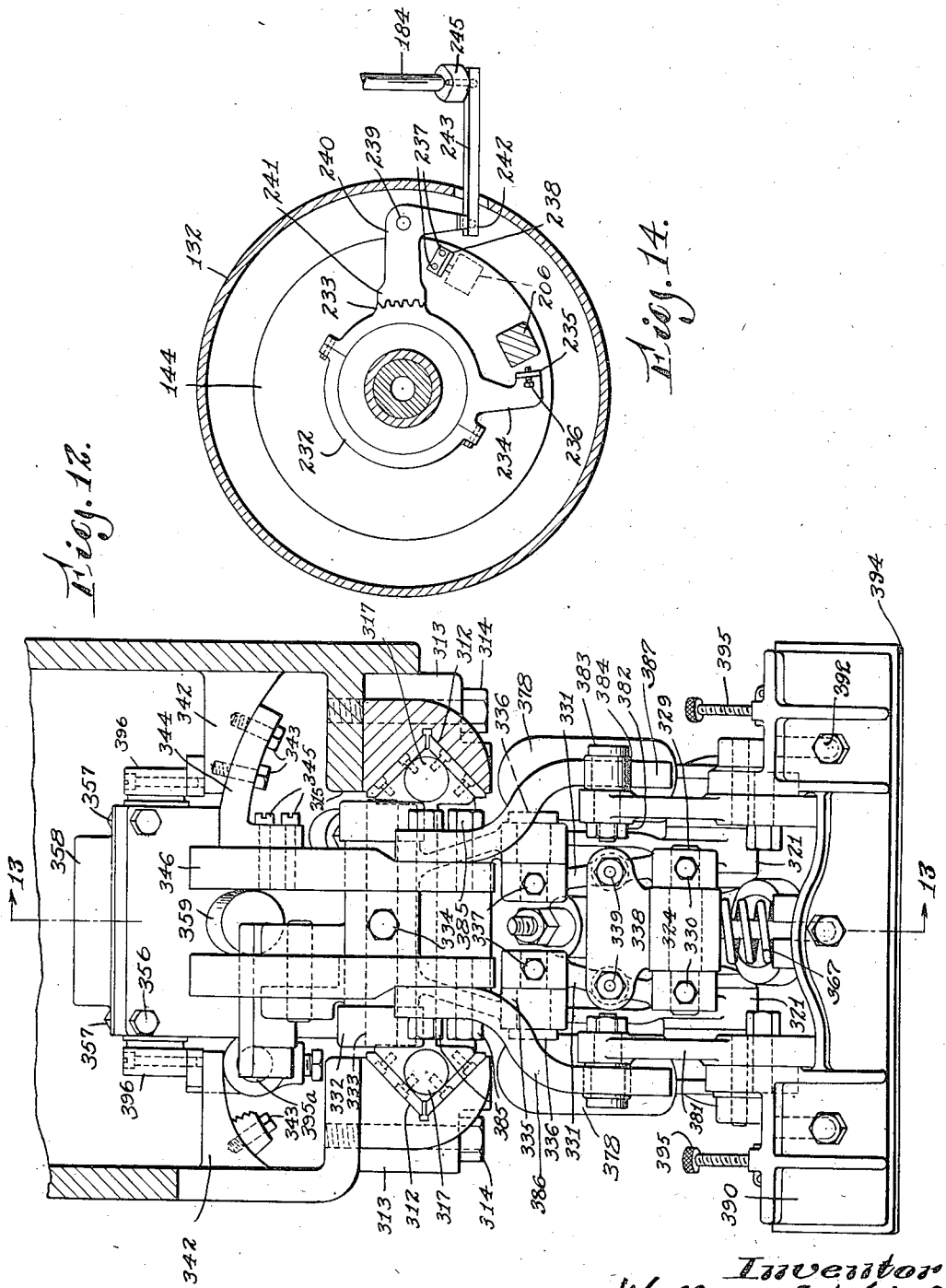

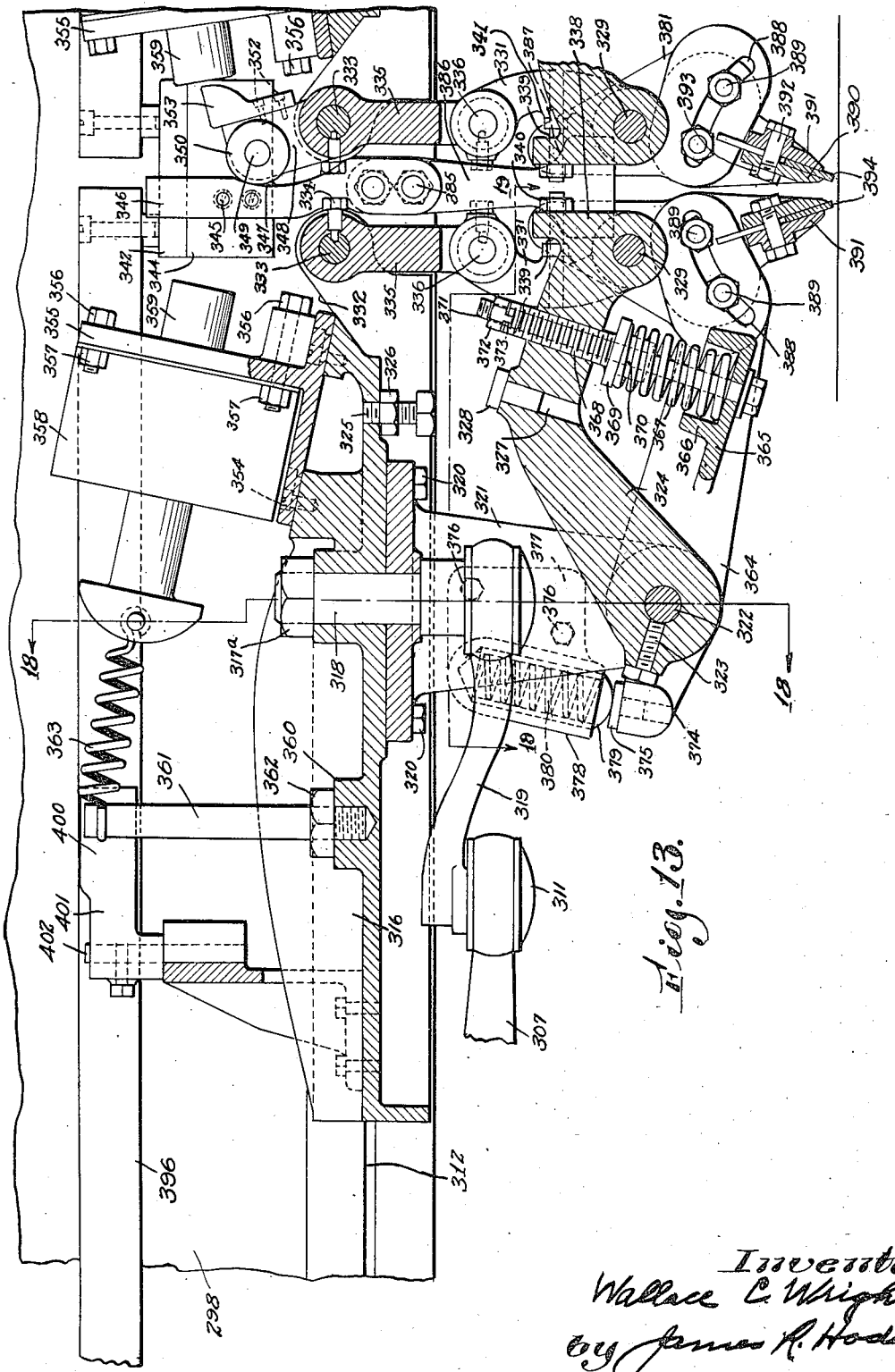

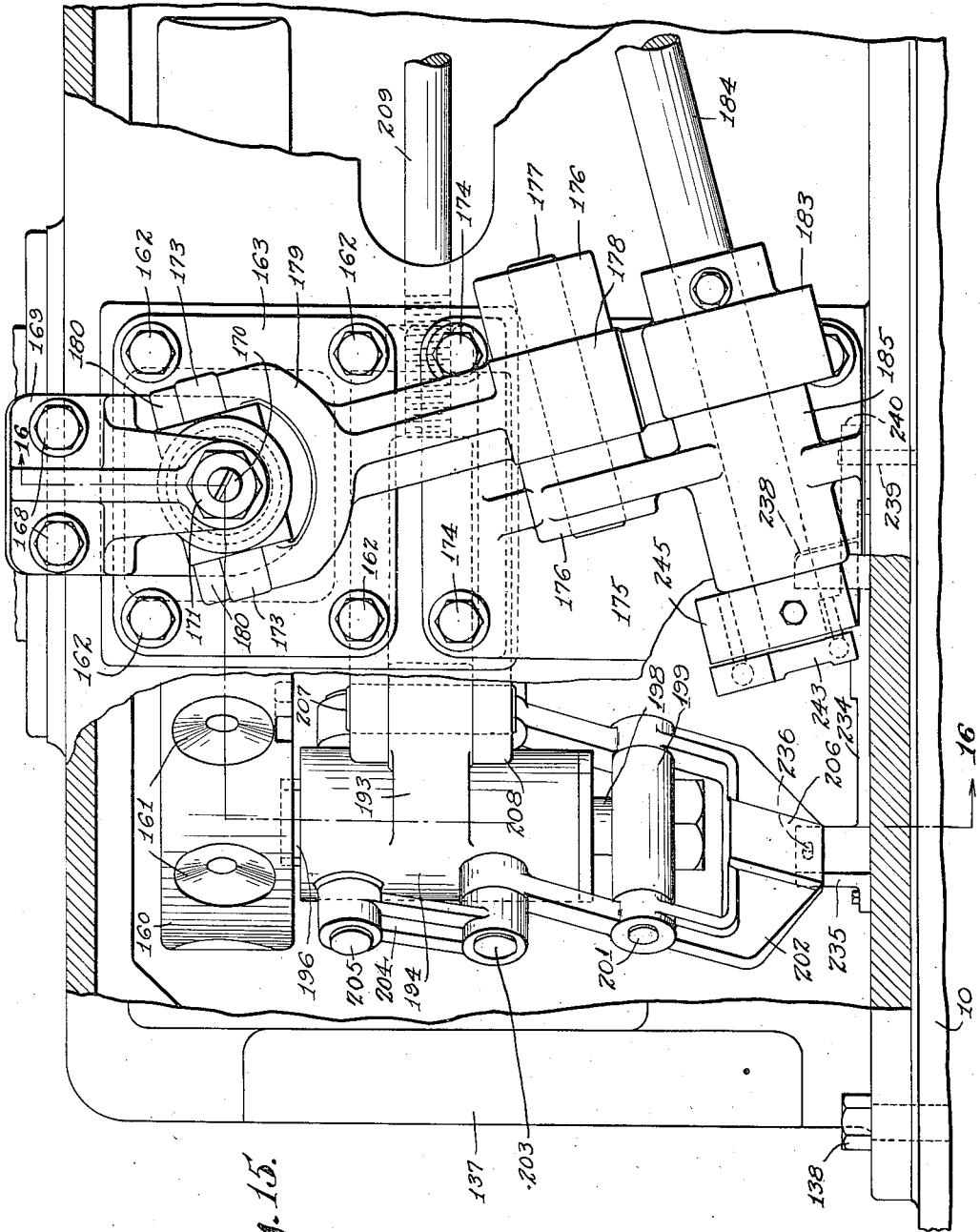

March 17, 1936.   W. C. WRIGHT   2,034,454
SLICKING MACHINE
Original Filed April 13, 1929   16 Sheets-Sheet 14

Inventor
Wallace C. Wright
by James R. Hodder
Attorney

March 17, 1936.                W. C. WRIGHT                2,034,454
                              SLICKING MACHINE
                  Original Filed April 13, 1929    16 Sheets-Sheet 15

Inventor
Wallace C. Wright
by James R. Hodda
Attorney

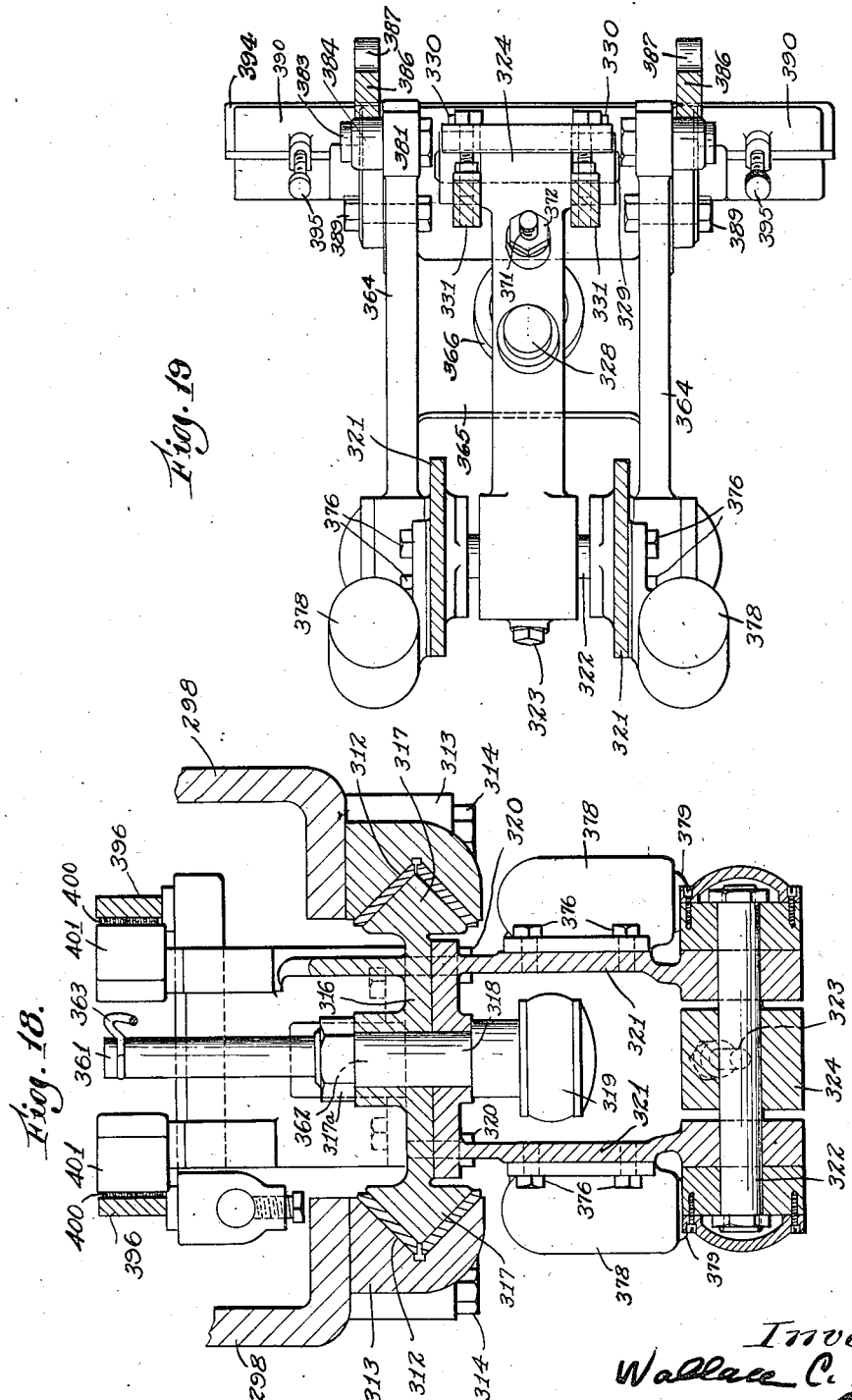

Patented Mar. 17, 1936

2,034,454

UNITED STATES PATENT OFFICE 2,034,454

SLICKING MACHINE

Wallace C. Wright, Brookfield, N. H., assignor to Harding Engineering Company, Boston, Mass., a corporation of Massachusetts Refiled for abandoned application Serial No. 354,828, April 13, 1929. This application August 11, 1934, Serial No. 739,442

28 Claims. (Cl. 149—17)

This invention relates to machines for operating upon hides, skins and leather as set forth in my abandoned application, Serial No. 354,828, filed April 13, 1929, for which this application is a refile. While the invention is illustrated as embodied in a machine specially designed to perform slicking operations upon hides and skins, it is to be understood that the invention and various important features thereof may have other applications and uses.

It is an object of this invention to provide for mechanical treatment of hides, skins, and leather by tools, suitable for the purpose, in such manner as to minimize to a marked degree, the effort and attention required of the operator. As a result, production is increased and an unusual degree of uniformity obtained in the product, it being a well-known fact that in obviating fatigue, both mental and physical, on the part of the operator a very real contribution is made in the direction of increase in production and of maintenance of quality and uniformity in the product. It is a further object of the invention to obviate the danger of injury to the work by the tools, particularly those having relatively sharp edges.

To these ends and in accordance with an important feature of the invention, there is provided power means under control of the operator for causing such relative rotative movement between a plurality of tools and a work support, over which the tools move in straight lines from a central portion of the work support outwardly to marginal portions thereof, so that all portions of the work will have been operated upon when the rotative movement comes automatically to an end at a predetermined point in such rotative movement. An advantage of such a construction resides in the fact that, once a piece of work is introduced in proper position on the work support and the machine started in operation, the given piece of work will be completely treated without further intervention on the part of the operator.

In a preferred construction, work clamping devices will be employed to hold the work against displacement on the work support during the described rotative movement by said power means, connections being conveniently provided between said clamping devices and a manually operable member for controlling said power means by which movement of the work clamping devices to operative position is initiated at the same time that said power means is started in operation. Preferably, each of the work clamping devices has associated therewith a cam member so arranged that one of the cam members operates to cause disconnection of said power means at the same time that all of the cam members operate to effect return of their associated work clamping devices to inoperative or work-releasing position. It will be observed that the provision of work clamping devices has not added to the complexity of the machine operations so far as the operator is concerned, since these devices are so connected to the starting and stopping mechanisms of the machine as to require in their operation no attention or effort upon the part of the operator.

An important feature of the invention resides in improved means provided to insure that the tool will be moved so gradually into contact with the work at the beginning of each work treating operation that the danger of injury to the work by a blow from the tool is obviated. This is of special importance in those cases wherein the tool is a blade having a relatively sharp edge as in unhairing, fleshing, and slicking-out machines. Conveniently, a stationary cam member is provided to lower the tool carrying member gradually to the point where the tool contacts with the work as the latter starts on its operative stroke over the work.

In the illustrated construction each tool is moved toward the work on the work support by a toggle associated with the tool, means, conveniently in the form of stop members, being provided to straighten the toggle at the beginning of the operative stroke of the tool, and subsequently to break the toggle to terminate the operative stroke of the tool and permit the latter to return idly to initial position. This toggle construction has the advantage of facilitating control of the tool by the operator at any desired point in the operative stroke of the tool. As illustrated, an electrically controlled plunger is mounted to move with the tool during its operative stroke, electrical connections being provided between the plunger and a manually operable member by which the plunger may be caused to operate instantaneously on the toggle to break the latter at any desired point in the operative stroke of the tool, thus terminating said operative stroke and permitting the tool to return idly to its initial position.

These and other important features of the invention and novel combinations of parts will now be described in detail in the specification and then pointed out more particularly in the appended claims.

In the drawings,—

Fig. 6 is a vertical sectional view on the line 6—6 of Fig. 1 looking in the direction of the arrows;

Fig. 7 is a vertical sectional view on the line 7—7 of Fig. 2;

Fig. 8 is a detail section on the line 8—8 of Fig. 7;

Fig. 9 is an enlarged detail view of a portion of Fig. 4;

Fig. 10 is a sectional plan view on the line 10—10 of Fig. 4;

Fig. 11 is a plan view of the blade holder on the line 11—11 of Fig. 7;

Fig. 12 is a section on the line 12—12 of Fig. 7;

Fig. 13 is a section on the line 13—13 of Fig. 12;

Fig. 14 is a section on the line 14—14 of Fig. 7;

Figure 4:
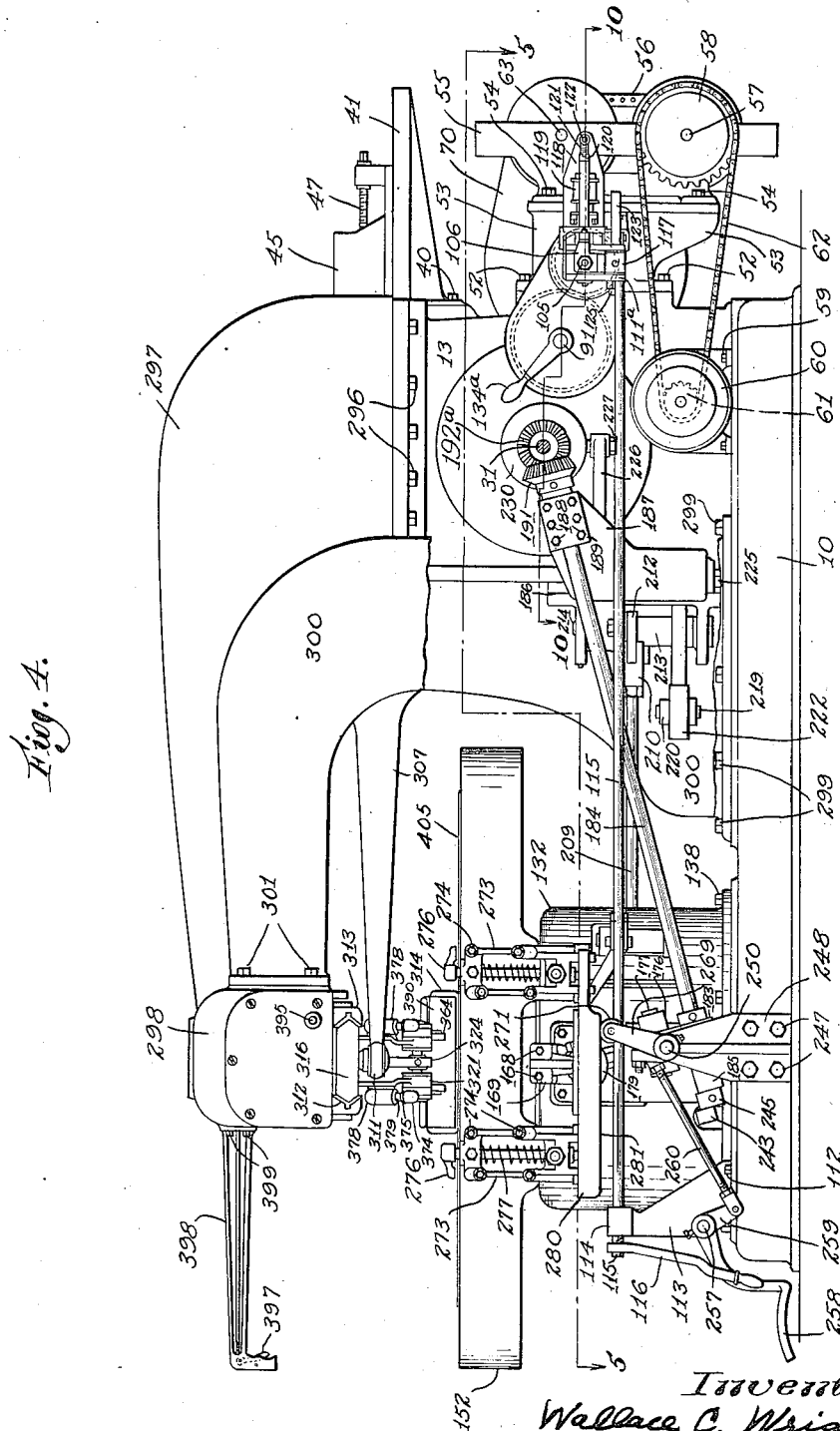
Fig. 4 is a right side elevation with parts broken away.
Figure 5:
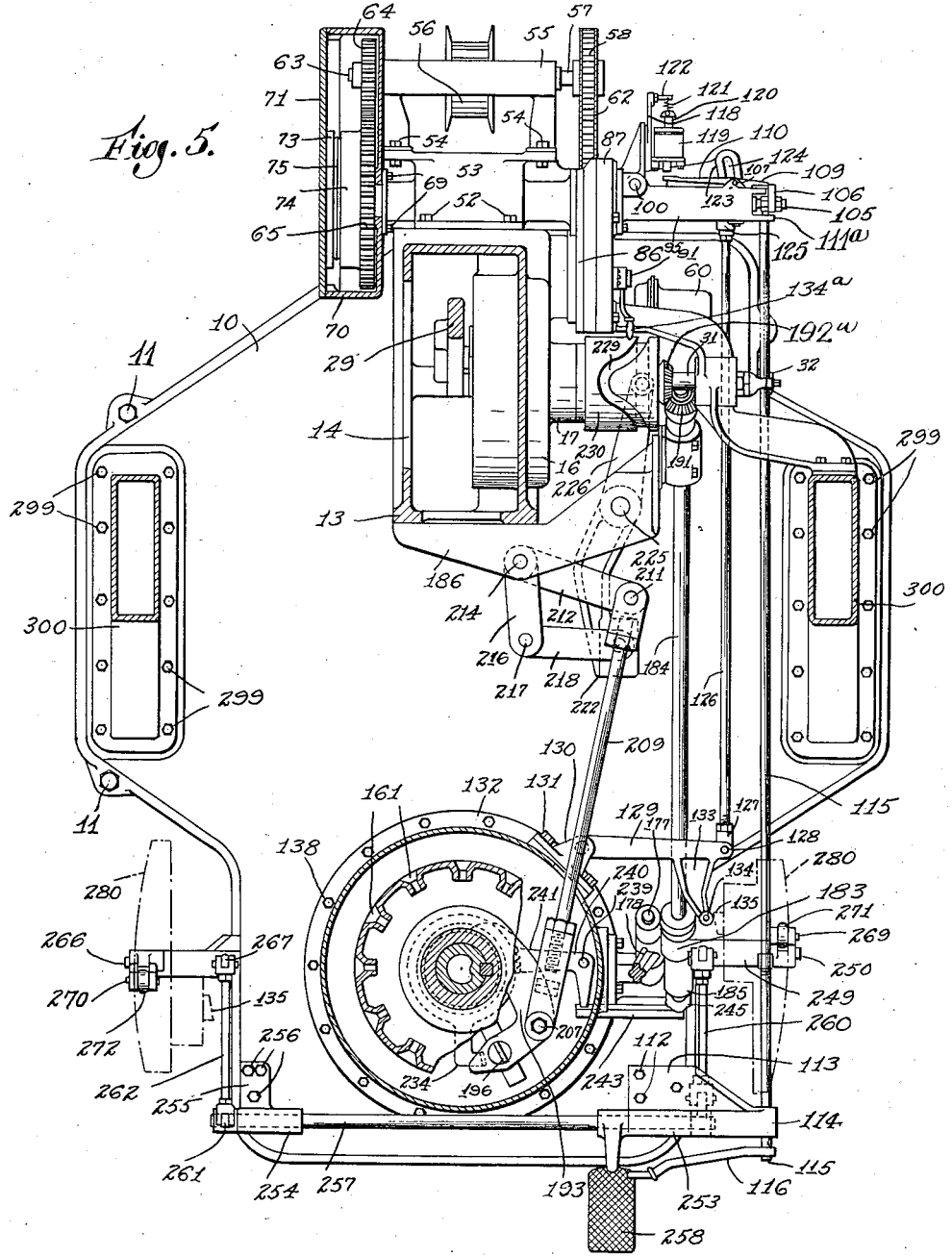
Fig. 5 is a sectional plan view on the line 5—5 of Fig. 4 looking in the direction of the arrows.
Figure 16:
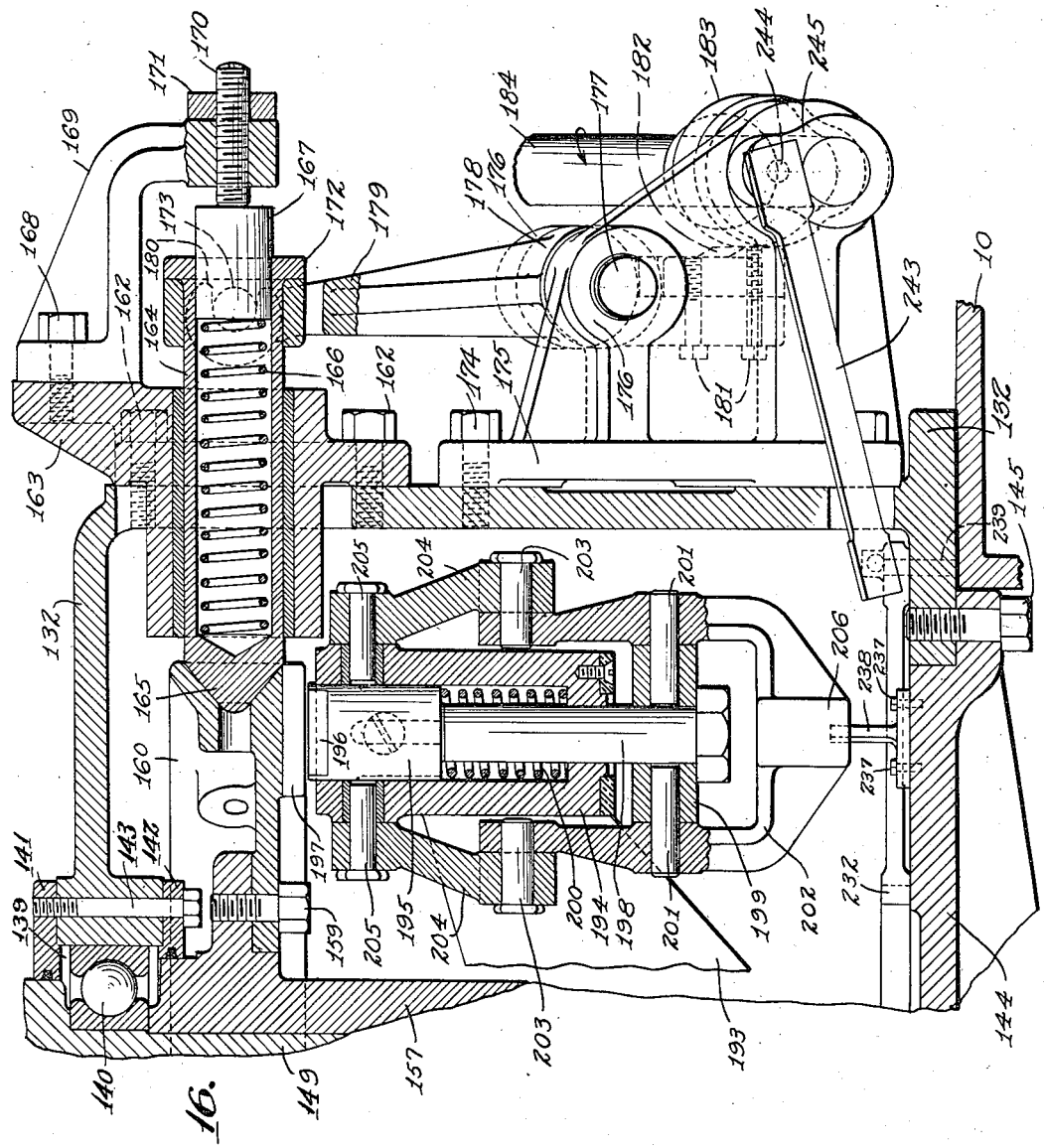
Figure 17:
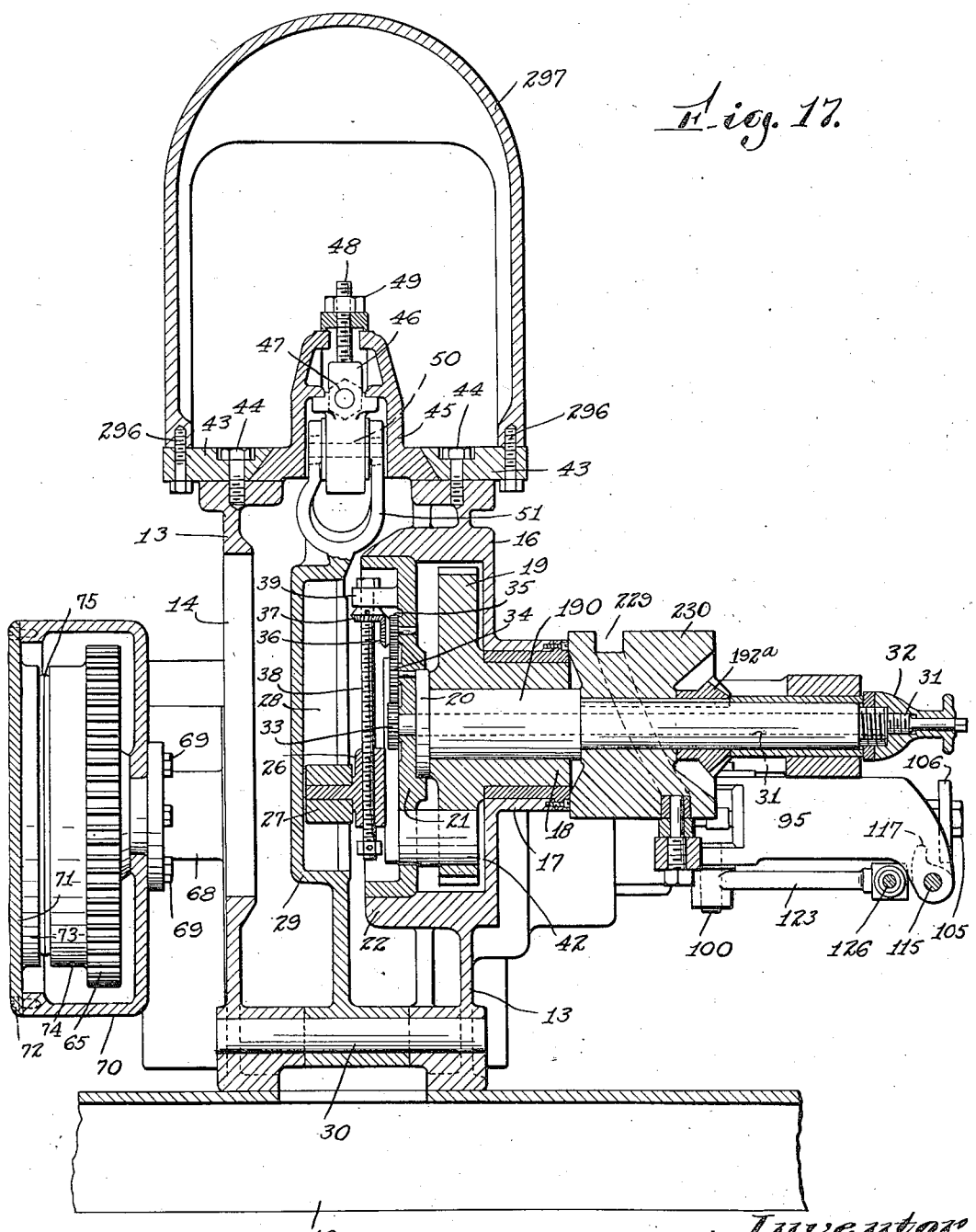

Fig. 15 is an enlarged elevation of that portion of the apparatus located at the front ends of shafts 184 and 209 in Figs. 4 and 5;

Fig. 16 is a section on the line 16—16 of Fig. 15;

Fig. 17 is a section on the line 17—17 of Fig. 9;

Fig. 18 is a section along the line 18—18 of Fig. 13; and

Fig. 19 is a section along the line 19—19 of Fig. 13.

Referring to the drawings, 10 designates a base plate secured in position on a floor or other supporting device by bolts 11 (Fig. 5) passing through holes in the base 10. Secured to or formed integral with the base 10 at the rear central portion thereof is a hollow pedestal or casing 13 (Figs. 2 and 3) provided at one side with an opening 14 closed ordinarily by a removable cover 15. On the side of the pedestal 13 opposite the opening 14 is an enlarged portion 16 (Figs. 5 and 10) carrying a centrally located bearing member 17 and in which bearing member is rotatably mounted a hollow hub 18 (Figs. 10 and 17) provided on the end within the casing 13 with a gear 19 for a purpose to be hereinafter described. Rotatably mounted within the hub 18 is a hollow shaft 190 provided at the end within the casing 13 with a flange 20. This flange 20 fits into a recess in one face of a cup-shaped member 21 which rotates in a bearing 22 formed on the inner end of the member 16, and the shaft 190 is secured to the cup-shaped member 21 by a plurality of screws 23 passing through the flange 20 into the body of the cup-shaped member 21. Formed on the inner face of the cup-shaped member and extending diametrically with respect to such cup-shaped member is a slideway 24, this slideway being provided with a longitudinally extending centrally arranged groove 25. Slidably mounted on the slideway 24 is a member 26 provided on its outer face with a stub shaft or crank pin 27. This stub shaft or crank pin 27 is rotatably and slidably mounted in a guide 28 extending longitudinally of a lever 29 that is pivotally mounted on a shaft 30 (Figs. 6 and 17) adjacent to the bottom of the casing 13.

The throw of the lever 29 is determined by the relative position of the member 26 on the slideway 24 and this member 26 is adjustable in the following manner. The shaft 190 is hollow and extending therethrough is a shaft 31, to the outer end of which is threaded an operating handle 32 (Fig. 17) and by means of which the shaft 31 may be rotated. On the other end of such shaft 31 and within the limits of the longitudinal groove 25 is secured a gear 33 which meshes with and drives an idler gear 34 rotatably mounted in the cup-shaped member 21, and this gear 34 in turn meshes with and drives a gear 35 rotatably mounted on a stub shaft secured to the cup-shaped member 21. Secured to the gear 35 is a bevel pinion 36 which meshes with and drives a bevel pinion 37 (Figs. 6 and 17) secured to a threaded shaft 38 rotatably mounted at one end in a bearing 39 formed on the cup-shaped member 21 and screwing into a threaded hole in the member 26. By rotating the handle 32 the shaft 31 is rotated and, therefore, the train of gears above described. Hence the position of the member 26 on the slideway 24 with respect to the shaft 30 may be altered at will, thereby controlling the amount of oscillatory movement given to the lever 29 about the shaft 30 as a center. Connecting the gear 19 and the cup-shaped member 21 is a member 42.

At the top of the casing 13 and on the rear end thereof is secured by bolts 40 an extension piece 41 (Figs. 2, 4, 6, 9) and on the extension piece, as well as on the top surface of the casing 13 and on either side thereof, are secured guides 43, (Fig. 17) such guides being secured to the casing 13 by bolts 44. The guides 43 form a guideway in which is slidably mounted a head 45 (Figs. 2, 4, 6 and 17). Mounted in the head 45 is a member 46, adjustable lengthwise of the head by means of a screw 47 and adapted to be clamped in adjusted position by screw 48 and nut 49. In the member 46 is secured a shaft 50 to which is pivotally and slidably attached the upper forked end 51 of the lever 29, the fork portions of the end 51 of the lever 29 having slots therein as indicated in Fig. 17 to slidably receive the ends of the shaft 50. Rotary movement of the shaft 190 causes, through the mechanism above described, an oscillating movement of the lever 29 about the shaft 30 as a center and reciprocating motion of the head 45 on the top of the casing 13. The purpose of this mechanism will be hereinafter described.

Figure 2:
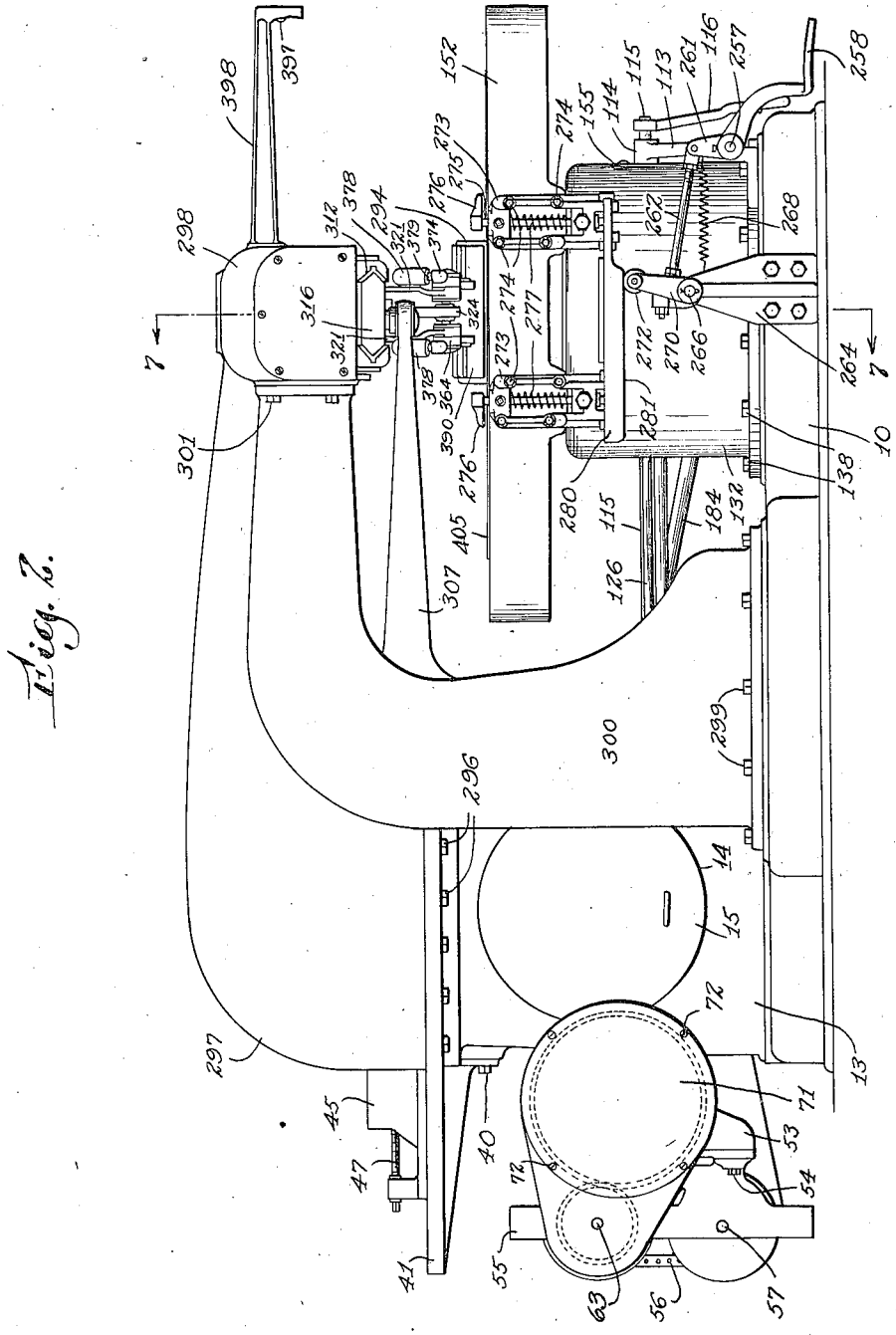
Fig. 2 is a left side elevation.
Figure 3:
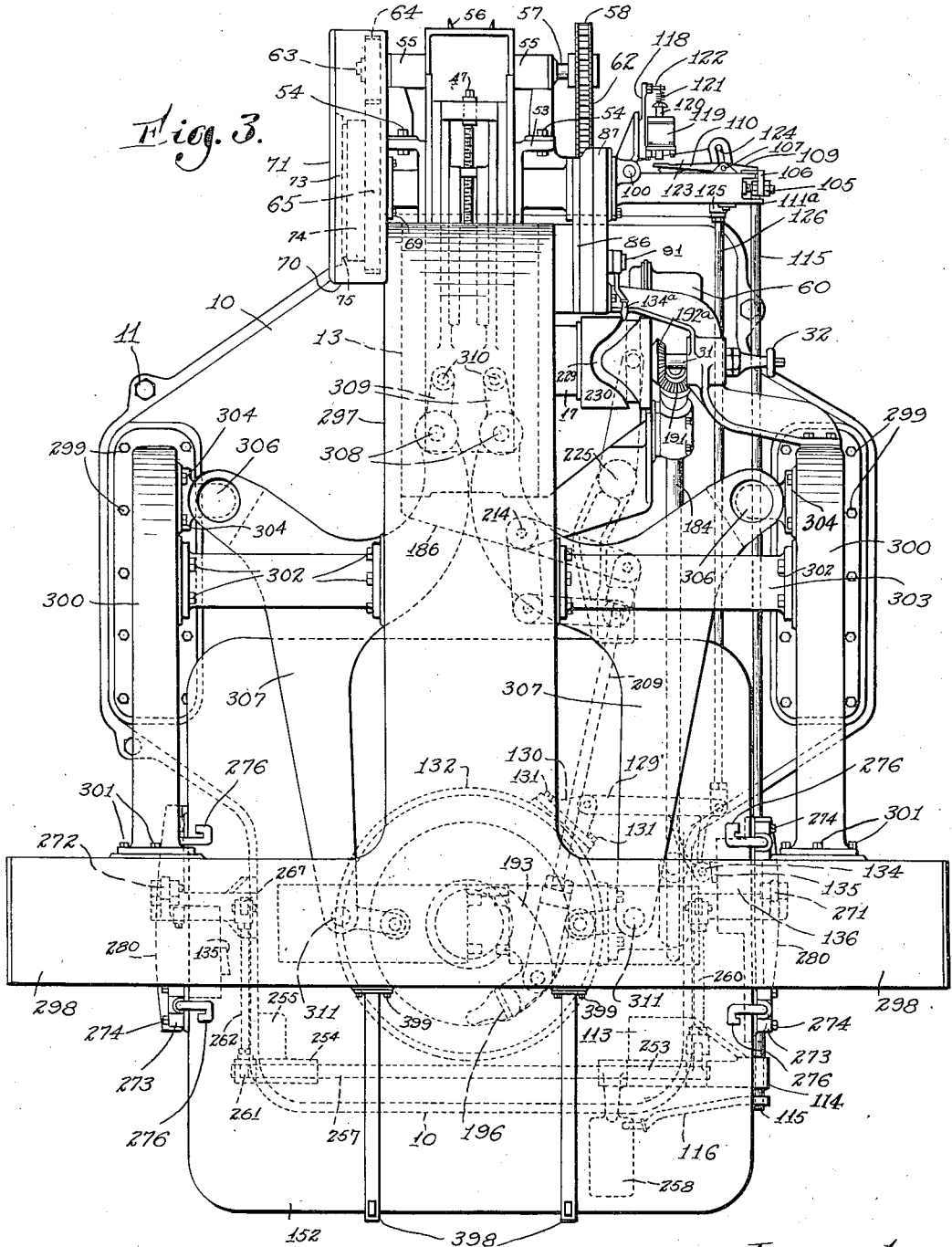
Fig. 3 is a plan view from above.

Secured to the rear of the casing 13, by bolts 52 is a casing 53 and secured to the rear of the casing 53 by bolts 54 is a casing 55 (Figs. 2 to 6, inclusive), such casing 55 housing the commercial form (year 1928) of the well-known Reeves speed reduction mechanism indicated generally by the reference character 56 (Figs. 2 and 4). The details of such mechanism are well known and will not be further described. Associated with and forming part of the Reeves speed controlling device 56 is a shaft 57 (Fig. 4), having secured at one end thereof a sprocket wheel 58. Secured to the base 10 adjacent the casing 13 by bolts 59 (Fig. 4) is a motor or other prime mover 60, the driver shaft of which is provided with a sprocket wheel 61 that is in alinement with the sprocket wheel 58 on the shaft 57. Over the sprocket wheels 58 and 61 runs an endless sprocket chain 62 and by means of which power is transmitted from the motor 60 to the shaft 57 of the speed controlling device 56. Also associated with and forming part of the speed controlling device 56 is a shaft 63 (Figs. 2, 3, 4) which has secured at one end thereof a pinion 64 (Figs. 3 and 5). This pinion 64 meshes with and drives a gear 65 (Figs. 3 and 10) rotatably mounted on roller bearings 66 secured in place on a sleeve 67 that in turn is secured in a hub 68 that is formed integral with or secured to the casing 53 and at one end thereof. Secured to the outer end of the hub 68 by bolts 69 is a casing 70 that encircles the gear 65 and pinion 64.

The end of the casing remote from the hub 68 is open and normally closed by a cover plate 71 (Fig. 10) removably held in position by screws 72. Formed on the inner face of the cover plate 71 and concentrically arranged with respect to the axis of the gear 65 is a brake surface 73. Arranged on the face of the gear 65 adjacent and concentrically with respect to the brake surface 73 is a clutch surface 74 that is also concentrically arranged with respect to the axis of the gear 65. Associated with the brake surface 73 and the clutch surface 74 is a combined clutch and brake drum 75, this brake drum being adapted to be brought into association with either the brake surface 73 or the clutch surface 74. Rotatably mounted in a sleeve 76 (Fig. 10) as one bearing member and in a bearing 76a secured in the member 53 is a hollow shaft 77, to the end of which, adjacent the gear 65, is keyed a disc 78. The combined brake and clutch drum 75 is provided with a plurality of perforations through which are slidably mounted a plurality of threaded bolts 79, such bolts threading into the disc 78, and between the under face of the head of the bolts 79 and the adjacent face of the drum 75 are coiled springs 80, which coiled springs tend to urge the combined brake and clutch drum 75 into association with the clutch face 74 on the gear 65.

Secured to the combined clutch and brake drum 75 is a shaft 81 which extends into the hollow shaft 77 and has a sliding and rotating fit therein. Also rotatably and slidably mounted in the hollow shaft 77 is a shaft 82, one end of which lies adjacent the end of the shaft 81 and the other end extends outwardly beyond the limits of the shaft 77 and has secured thereto an adjusting abutment 83. Between the ends of the shafts 82 and 81 is arranged a thrust bearing 84 of any approved form. Secured to the casing 53 and to the casing 13 by bolts 85 or in any other convenient manner, is a housing 86 provided with a cover plate 87 secured in position by screws 88. Lying within the casing 86 and keyed to the end of the hollow shaft 77 is a pinion 89 which meshes with and drives a gear 90 keyed to a shaft 91, that is rotatably mounted in a ball bearing 92 and a plain bearing 93 in the casing 13. To the shaft 91 is keyed a pinion 92a which meshes with and drives the bull gear 19 heretofore referred to. Assuming for the moment that the combined brake and clutch drum 75 is in engagement with the clutch face 74 on the gear 65 and that the motor 60 is operating, then it will be obvious that power is transmitted from the motor 60 through the train of gearing above referred to so as to drive the gear 65 and such gear, in turn, drives the hollow shaft 77 with its associated gear 89, such gear, in turn, driving the shaft 91 and consequently the shaft 190. The shaft 190 will, as above described, cause an oscillatory motion of the lever 29 and a reciprocating motion of the crosshead 45 and this motion will continue until power is shut off from the motor 60 or the combined brake and clutch drum 75 is disengaged from the clutch face 74. In order to insure a quick stopping of the gear 19 and parts associated therewith, the mechanism must be devised not only to disengage the combined brake and clutch drum 75 from the clutch face 74 but to move such combined brake and clutch drum 75 into engagement with the brake surface 73 on the cover 71.

Secured to the cover plate 87 (Fig. 10) by bolts 94 is a bracket 95, such bracket having formed therein a cylindrical recess 96 in which is slidably mounted a piston 97. Secured to the piston 97 is a piston rod 98, such piston rod passing through a perforation in the end of the bracket 95. Secured to the end of the piston 97 remote from the piston rod 98 is an adjusting mechanism 99, this adjusting mechanism being separated from the adjusting mechanism 83 above described as being attached to the shaft 82. Rotatably mounted in the bracket 95 is a shaft 100 to one end of which is secured a hub 101 that has formed integrally therewith a radially extending member 102 which normally fills the space between the adjusting devices 99 and 83. Within the cylindrical recess 96 and behind the piston 97 is a coiled spring 103 which tends constantly to urge the piston 97 and all parts connected thereto outward of the cylindrical recess 96 or to the left, as viewed in Fig. 10, thus maintaining the adjusting member 99 in engagement with the laterally projecting member 102. The outer end of the piston rod 98 is reduced in diameter and threaded as indicated at 104, and adjustably mounted on such threaded end by means of nuts 105 is a trip arm 106. Secured to the bracket 95 is a shaft 107 on which is rotatably mounted a lever, one arm 109 of which may be placed in the path of movement of the trip arm 106, while to the other arm 110 is attached one end of a spring 111, the other end of this spring engaging in a recess in the bracket 95. The spring 111 always tends to rotate the lever shaft 107 in a clockwise direction so as to bring the arm 109 of the lever into the path of movement of the trip arm 106 and when the lever arm 109 is moved out of the path of movement of the trip arm 106, the force of the spring 103 will move the piston 97 to the left, as viewed in Fig. 10, causing the laterally projecting member 102 to force the shaft 82 to the left also as viewed in said Fig. 10, and this movement is transmitted to the shaft 81 connected to the combined brake and clutch drum 75, which will, therefore, be moved against the tension of the springs 80 to the left, thus moving the combined brake and clutch drum 75 out of engagement with the clutch face 74 and into engagement with the brake surface 73. Conversely, if the piston 97 is moved to the right, as viewed in Fig. 10, the springs 80 will cause a movement of the combined brake and clutch drum 75 to the right, moving the same from engagement with the brake surface 73 and into engagement with the clutch surface 74, thus connecting the hollow shaft 77 with the train of gears 64—65 to continue the movement above described. Formed integrally with the bracket 95 is a bearing 111a. Secured to the base 10 by bolts 112 is a bracket 113 (Figs. 1, 2, 4, 5, 6) and at the top of this bracket is formed a bearing 114 (Figs. 3, 4, 5) which is in alinement with the bearing 111a on the bracket 95. Rotatably mounted in the bearings 111a and 114 is a shaft 115 and secured to the end of this shaft at the end adjacent to the bearing 114 is an operating lever 116 and by means of which the shaft 115 may be rotated. Secured to the shaft 115 adjacent to the bearing 111a is a member 117 (Figs. 4 and 9) which is adapted to engage with the trip arm 106. It is obvious, therefore, that if the lever 116 is operated to rotate the shaft 115 in the proper direction the member 117 thereon, engaging with the trip arm 106, will move the same and, therefore, the piston 97 to the right, as viewed in Fig. 10, allowing the springs 80 to function so as to bring the combined brake and clutch drum 75 into engagement with the clutch face 74.

Secured to the bracket 95 is a carrier 118 (Figs. 3, 4, 5, 9, 10) on which is mounted a solenoid 119. Associated with the solenoid 119 is a plunger armature 120 (Fig. 10) which is adapted to engage with the arm 110 of the lever above referred to when the solenoid 119 is energized. Attached to one end of the plunger 120 is one end of a coiled spring 121, the other end being attached to a pin 122 secured to the carrier 118 and which spring returns the plunger armature 120 to its normal or inoperative position, as shown in Fig. 10, when the solenoid 119 is de-energized. Secured to the shaft 100 remote from the hub 101 is an arm 123 (Fig. 10) provided on its outer end with an arcuate slot 124 and to which is adjustably secured a clevis 125. Secured to the clevis 125 is one end of a rod 126 and to the other end of this rod is secured a clevis 127. The clevis 127 is pivotally attached by shaft 128 to one end of a link 129 (Figs. 3, 5, and 10), this link being pivotally attached at its other end to a bracket 130, secured by bolts 131 to a pedestal and casing 132, which pedestal will be described in detail hereinafter. Secured to and forming part of the link 129 is an arm 133, which has rotatably mounted on its outer end a roller 134 adapted to be engaged by a cam 135 carried by a member 136 that in the illustrated construction is carried by a table 152. The normal operation of the cam 135 will cause a rotary movement of the link 129 (Figs. 3 and 5) on the bracket 130 and, therefore, a rotary movement of the shaft 100 (Fig. 10) so as to bring the member 102 thereon into engagement with the member 83 on the shaft 82, causing thereby a movement of such shaft 82 to the left, as viewed in Fig. 10, and a movement of the combined brake and clutch drum 75 to the left away from the clutch face 74 and into engagement with the brake surface 73, and this operation will occur without disturbing the setting of the piston 97 by any of the devices above described.

Figure 1:
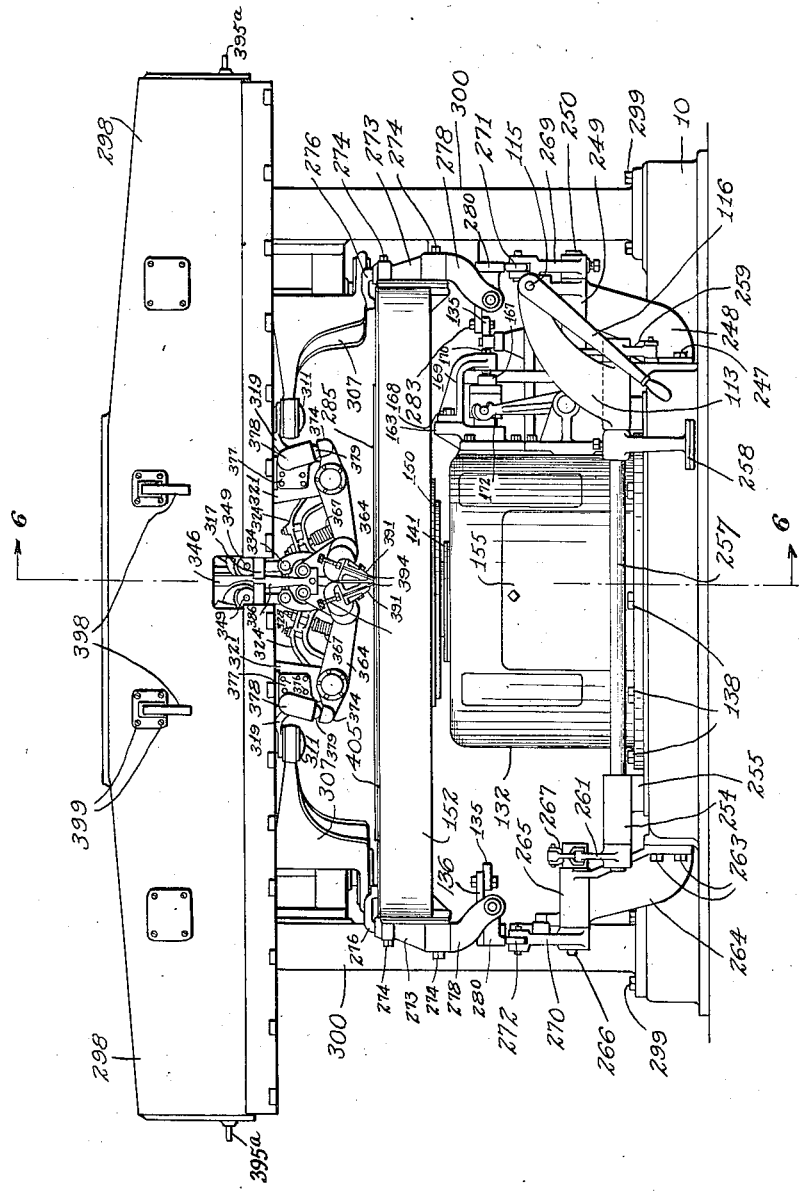
Fig. 1 is a front elevation of a machine illustrating one embodiment of my invention.

In front of the casing 13 and in the base 10 is formed a depression 136ᵃ (Fig. 7) and secured to the top surface of the base 10 and surrounding the depression 136ᵃ is the casing or pedestal 132. Bolts 138 (Fig. 1) are utilized to hold the casing or pedestal 132 in position. The upper face of the casing or pedestal 132 is provided with a circular opening and in said opening is located a ball bearing 140, (Figs. 7 and 16) this bearing being held in position by a top annular plate 141, a bottom annular plate 142, and a plurality of bolts 143, extending through the bottom plate 142, the material of the upper face of the pedestal 132 and screwing into holes in the top plate 141. The lower surface of the casing or pedestal 132 is also provided with a centrally arranged orifice in which fits a bottom plate 144, such bottom plate being secured to the under face of the pedestal or casing 132 by bolts 145. The central portion of the bottom plate 144 is perforated and countersunk to receive a ball bearing 146 held in position by an annular collar 147, that is secured to the under face of the bottom plate 144 by bolts 148. The ball bearings 140 and 146 are in vertical alinement with respect to each other and in such bearings is rotatably mounted a hollow vertical shaft 149, this shaft being provided at its top end with a circular flange 150, to which is secured by bolts 151, the table 152 of suitable shape and dimensions. The lower end of the central hollow shaft 149 is threaded to receive a collar 153 by means of which such shaft is retained in position with respect to the ball bearings 140 and 146. The pedestal 132 is provided on its front side with an opening through which the mechanism in the interior may be adjusted, and such opening is closed by a removable door 155 (Fig. 1). Surrounding the member 149 between the bearings 140 and 146 and keyed thereto by a key 156 (Fig. 7) is a sleeve 157, such sleeve being provided adjacent its top end with a flange 158. Secured to said flange by a plurality of bolts 159 is a cylindrical index plate 160 (Figs. 5, 7, 15 and 16), such index plate being provided about its periphery with equally spaced cone-shaped indentations 161, there being as many of these indentations 161 as it is desired to have positions on the table 152. That is, if it is desired to have the table 152 rotate through a complete revolution in twelve steps, there will be twelve of the indentations 161 equally spaced about the outer periphery of the index plate 160.

Secured to the outer surface of the pedestal 132 and at one side thereof by bolts 162 is a bracket 163 (Figs. 7, 15 and 16) and in such bracket is slidably mounted, in a horizontal plane and radially with respect to the sleeve 157, a hollow plunger 164, which hollow plunger has its forward or inner end tapered, as indicated at 165, to fit the taper of the wedge-shaped indentations 161. The plunger 164 is hollow and in the interior is located a coiled spring 166 and in such interior is slidably mounted a cylindrical plug 167, the inner end of which engages with the spring 166. Secured to the bracket 163 by bolts 168 is a bracket 169, having a threaded hole therein in axial alinement with the axis of the member 164 and in such threaded hole is arranged a screw 170 provided with a locking nut 171 for locking the same in adjusted position. The end of the screw 170 engages with one end of the slidable plug 167 and is utilized to adjust the tension of the spring 166. The spring 166, therefore, yieldingly holds the tapered end 165 of the member 164 in engagement with one of the indentations 161 and thus holds the table 152 in adjusted position. The end of the member 164 remote from the tapered point 165 is enlarged, as indicated at 172, and is provided with diametrically arranged laterally projecting pins 173 (Figs. 15 and 16). Secured to the side of the pedestal 132 by bolts 174 (Fig. 15) and beneath the bracket 163 is a bracket 175 and on this bracket are formed bearing members 176 and in which bearing members is secured a shaft 177. Rotatably mounted on shaft 177 is a lever 178, provided at one end with a forked member 179, the tines of the fork being provided with hooks 180 that encircle the pins 173. Secured to the other end of the lever 178 by bolts 181 (Fig. 16) is a cam plate 182 adapted to be engaged by a cam 183 secured to a shaft 184 that is rotatably mounted in a bearing 185 (Fig. 15) formed on the bracket 175. Secured to the casing 13 by bolts 185ᵃ (Fig. 9) is a bracket 186, this bracket being provided with an extension 187 (Figs. 4, 9 and 10) to which is secured, by bolts 188, a bearing 189 in which is rotatably mounted one end of the shaft 184 (Figs. 4, 9, 15, and 16). Secured to the end of the shaft 184 adjacent the bearing 189 is a beveled pinion 191, which meshes with and is driven by a corresponding beveled pinion 192ª secured to a reduced portion of the shaft 190 (Figs. 10 and 17) heretofore described as being rotatably mounted in the hub 18 of the gear 19 within the casing 13. Rotation of the shaft 190, therefore, will cause, by means of the cam plate 182 (Fig. 16) and cam 183, a periodical movement of the cylindrical member 164 away from the index plate 160 or to the right, as viewed in Figs. 7 and 16, so as to make it possible for the member 149 to be rotated.

Rotatably mounted on the member 149 is a split sleeve 192 (Fig. 7), which sleeve has formed integrally therewith a radially extending arm or bracket 193 (Fig. 15). Secured to or formed integrally with the bracket 193 is a cylindrical member 194, in which is slidably mounted a piston 195 (Fig. 16). The upper end of this piston 195 is substantially rectangular in shape, as indicated at 196, and this rectangular portion is adapted to engage in radially extending recesses 197 formed in the bottom of the index plate 160. Such radially extending recesses 197 are symmetrically arranged about the surface of the index plate 160, there being one such recess 197 for each of the conical depressions 161. Secured to the lower end of the piston 195 is a piston rod 198, which piston rod extends down through an opening in the bottom of the cylindrical member 194 and has secured to its lower end a crosshead 199. In the cylindrical member 194 and beneath the piston 195 is a coiled spring 200, which tends constantly to urge the piston 195 upwardly and this upward movement is limited by the extent to which it is possible to move the piston rod 198 upwardly. Pivotally attached to the crosshead 199 by shafts 201, is a U-shaped member 202, the pivotal connection of such U-shaped member on the shafts 201 being intermediate the ends of the legs or arms of such U-shaped member, as clearly shown in Fig. 16. To the upper end of each of the arms of the U-shaped member 202 is pivotally attached on shafts 203 the lower end of links 204, and the upper ends of these links 204 are pivotally attached by shafts 205 to the upper end of the cylindrical member 194. The lower end of the U-shaped member 202 is provided with a downwardly extending portion 206, which is adapted to operate the linkage composed of the links 204 and U-shaped member 202, as will be hereinafter described. Pivotally attached to the bracket 193 by a shaft 207 (Fig. 15) is one end of a clevis 208 and the other end of this clevis 208 has screwed therein one end of a shaft 209. The other end of this shaft 209 (Figs. 4 and 5) has adjustably mounted thereon a clevis 210 (Fig. 9) which is pivotally attached by means of pin 211 (Fig. 5) to one end of an arm 212 that is formed integrally with a sleeve 213 (Fig. 9). This sleeve 213 is rotatably mounted on a shaft 214 secured in the bracket 186 above described as being attached to the casing 13 by the bolts 185ª. Secured to the sleeve 213 by a bolt 215 or formed integrally therewith, as may be desired, is a radially extending arm 216 (Fig. 5) and to the outer end of this arm 216 is pivotally attached, by bolt 217, one end of a link 218 (Figs. 5 and 10). The other end of this link 218 is provided with a shaft 219 (Figs. 9 and 10), on which is mounted a bearing member 220, and this bearing member 220 is adjustably mounted in a rectangular slot 221 (Fig. 10) formed on the outer end of an arm 222, that in turn is formed integrally with a sleeve 224 rotatably mounted on a shaft 225 in the extension 187 of the bracket 186.

Also formed integrally with the sleeve 224 and extending radially outward therefrom is an arm 226 (Fig. 5) which carries, at its outer end, a vertically extending shaft 227 (Fig. 9), this shaft, in turn, being provided with a cam roller 228 that works in a cam race 229 formed in a cam body 230, such body being secured to a reduced end of the shaft 190. Rotary movement of the shaft 190, therefore, will cause a rotation of the cam body 230 and an oscillatory motion of the sleeve 224 on its shaft 225 and will thus cause, by means of the link 218, sleeve 213, and arms 212 and 216, a longitudinal reciprocating motion of the shaft 209. This motion of the shaft 209 will be imparted to the bracket 193 (Fig. 15) that is attached to the rotatable sleeve 192 and, therefore, there will be an oscillatory motion about the member 149 as a center of the cylindrical member 194 and attached parts, so it will be obvious that, if the rectangular portion 196 of the piston 195 is in engagement with one of the slots 197 on the under face of the index plate 160, that such index plate and, therefore, the table 152, will have imparted to it a corresponding movement.

In order to bring the rectangular member 196 (Figs. 15 and 16) periodically into and out of operative position with respect to the rectangular depressions 197, I have rotatably mounted on the lower end of the sleeve 157 an annular member 232, which has formed thereon at a portion of its outer periphery a segment of a gear 233 (Figs. 7 and 14). Also, I have formed on the annular member 232 a radially extending arm 234 provided at its end with an up-turned portion 235 (Figs. 14 and 15) lying in the path of the oscillatory movement of the U-shaped member 202, and particularly the lower portion 206 thereof, and I have provided such upturned portion 235 with a screw 236, which is adjustable and which is adapted to engage with or be engaged by the portion 206 of the U-shaped member 202. Also, on the top surface of the member 144 I have secured, by bolts 237, an angle member 238 (Figs. 14, 15, and 16), which also lies in the path of movement of the portion 206 of the U-shaped member 202. Secured to the bottom flange of the casing 132 and extending upwardly therefrom is a stub shaft 239 and on this shaft is rotatably mounted an angle member 240, one arm of which is provided with a segmental gear 241 (Fig. 14) which meshes with the segmental gear 233, above described as being on the annular member 232, and the other arm is pivotally attached by a ball socket 242 to one end of a connecting rod 243. The other end of this connecting rod 243 is pivotally attached to a crank pin 244 (Fig. 16) on a crank arm 245 attached to the end of the shaft 184. The U-shaped member 202 and the links 204 constitute a toggle arrangement for positioning the piston 195, and if we assume that the U-shaped member 202 has been rotated about the shafts 201 in a counter-clockwise direction until the links 204 and the U-shaped member 202 are in a straight line, then it will be obvious that the piston 195 will be in its lowermost position and with the rectangular portion 196 thereof out of engagement with any of the radially extending rectangular slots 197 on the lower face of the index plate 160. If now the shaft 190 is rotating, there will be a corresponding rotation of the cam body 230 (Figs. 5, 9, and 10) which will produce an oscillatory motion of the sleeve 224 on the shaft 225 and, therefore, a rearward movement or a movement toward the casing 13 of the shaft 209 (Figs. 5 and 15), which will thereupon rotate the sleeve 192 (Fig. 7) on the member 157 and carry in such rotation the cylinder 194 (Figs. 7 and 15) and parts attached thereto that are mounted on the bracket 193. This rotary movement of the sleeve 192 will continue until the portion 206 (Figs. 14, 15, 16) of the U-shaped member 202 engages with the angle member 238 and such engagement will cause a rotary movement of the U-shaped member 202 on the shaft 203, which will thereupon throw the links 204 and U-shaped member 202 out of alinement and the spring 200 will assist in forcing the piston 195 (Fig. 16) upward in the cylinder 194 and into engagement with one of the radially extending rectangular slots 197 on the lower face of the index plate 160. During this rearward movement of the shaft 209, the tapered or wedge-shaped end 165 (Fig. 16) of the cylinder 164 has been in engagement with one of the wedge-shaped indentations 161 (Figs. 5 and 15) in the index plate 160 and such index plate and, therefore, the table 152 have remained stationary. Simultaneously with the rearward movement of the shaft 209, there has been a rotative movement of the shaft 184 (Figs. 5, 15 and 16) and, therefore, as the shaft 209 nears the end of its stroke, the cam 183 on the shaft 184 will engage the cam member 182 on the member 178 and the arm 179 will be rotated about the shaft 177 in a clockwise direction, as viewed in Fig. 16, and the hooks 180 thereon engaging with the pins 173 will move the sleeve 164 to the right, as shown in such Fig. 16, moving the point 165 thereof out of engagement with the tapered indentation 161, and will maintain such members out of engagement with each other until a considerable portion of the forward stroke of the shaft 209 has taken place, due to the rotation of the cam body 230 (Fig. 10). As the cam body 230 rotates, there is imparted necessarily a forward or downward movement of the shaft 209, as shown in Fig. 5, and the rectangular portion 196 (Fig. 15) of the piston 195 engaging the rectangular slot 197 in the index plate 160 will rotate such index plate in a clockwise direction, as viewed in Fig. 5, and this movement will continue until the cam 183 (Fig. 16) has released the cam 182 so as to allow the spring 166 to force the cylinder 164 to the left, as viewed in Fig. 16, so as to bring the end 165 thereof into engagement with the next succeeding tapered indentation 161 in the index plate 160, and also until the end 206 of the U-shaped member 202 has been brought into engagement with the end of the screw 236 on the arm 234. The shaft 184 rotating, will, through the crank pin 244 and connecting rod 243 (Figs. 14 and 16), rotate the angle member 240 on the shaft 239, whereupon the segmental gears 241 and 233 will be moved so as to rotate the annular member 232 and force the screw 236 against the end 206 of the U-shaped member 202, rotating such U-shaped member so as to bring the links 204 and U-shaped member 202 into alinement with each other, thus bringing the piston 195 into its lowermost position or into the position shown in Fig. 16 preparatory to another rearward movement of the cylinder 194.

Secured to one side of the forward part of the base 10 by bolts 247 (Figs. 4 and 7) is a bracket 248 which has formed at its upper end a bearing 249, and in this bearing is rotatably mounted a shaft 250. Secured to one end of the shaft 250 is a hub 251, having formed integrally therewith a radially extending arm 252. Formed in the bracket 113 (Figs. 1 to 6, inclusive) is a bearing 253 (Figs. 3 and 5) which is in alinement with a bearing 254 formed on a bracket 255 that is secured to the top surface of the base 10 and at the side remote from the bracket 113 by bolts 256. Rotatably mounted in the bearings 253 and 254 is a shaft 257. Secured to the shaft 257 intermediate the ends thereof is a foot treadle 258 and by means of which the shaft 257 may be rotated through a portion of a revolution. Secured to the end of the shaft 257 adjacent the bearing 253 is an arm 259 (Fig. 4) and to the free end of this arm 259 is pivotally attached one end of a connecting rod 260, the other end of this connecting rod being pivotally attached to the arm 252 (Fig. 7) formed integrally with the hub 251 secured to the shaft 250. Secured to the end of the shaft 257 adjacent the bearing 254 is an arm 261 (Figs. 1, 3 and 5), to the free end of which is pivotally attached one end of a connecting rod 262. Secured to the front side of the base 10 adjacent the bearing 254 by bolts 263 (Fig. 1) and in alinement with the bracket 248 is a similar bracket 264, this bracket having formed thereon, at its upper end, a bearing 265 that is in alinement with the bearing 249 (Figs. 1 and 5) on the bracket 248. In such bearing 265 is a shaft 266 (Figs. 1, 2 and 5) and secured to one end of said shaft is an arm 267 (Fig. 5), to the free end of which is pivotally attached one end of the connecting rod 262. Rotation of the shaft 257, therefore, by the operation of the treadle 258, for example, will, through the arms 259 and 261 (Fig. 1) rotate the shafts 250 and 266 simultaneously and, as will be obvious from an inspection of Figs. 1, 2 and 4 such shafts will be operated in opposite directions. A spring 268 (Fig. 2), connected one end to the free end of the arm 261 and the other to the bracket 264, tends to rotate the shaft 257 in a counterclockwise direction, as viewed in Fig. 2, so as to rotate the foot treadle 258 in a counterclockwise direction, or into the position shown in Fig. 2. Secured to the outer end of the shafts 250 and 266 are arms 269 and 270, respectively, and in each of these arms is rotatably mounted a roller 271 and 272, respectively.

Secured to opposite sides of the table 152 are pairs of brackets which are identical in construction and the devices carried thereby are also identical in construction and operation, and therefore but one of such brackets and associated parts will be described. This bracket is indicated generally by the reference numeral 273 (Fig. 7) and is secured to the side of the table 152 by bolts 274. Slidably mounted in the bracket 273 is a vertically arranged rod or shaft 275 (Fig. 2) provided at its top end with a laterally extending clamping member 276 which is adapted to engage with the top of the table 152 or with articles placed thereon and extending outward toward the periphery of such table. Associated with the shaft 275 is a spring 277 (Fig. 4) which tends to move the shaft 275 and associated clamping member 276 downwardly with respect to Figs. 1, 2 and 4. The lower end of the shaft 275 extends downwardly beyond the limits of the bracket 273, for a purpose to be hereinafter described. The bracket 273 is provided with a pair of downwardly and inwardly extending lugs 278, and these lugs, at their lower end, are drilled to receive a shaft 279 (Fig. 7). The lugs 278 of each pair of brackets 273 have the holes thereof in alinement with each other and the shaft 279 extends through such holes and connects the lower part of the brackets 273. On the shaft 279 and associated with each pair of lugs 278 is an angle member 280 (Figs. 1 to 5, inclusive) this angle member being rotatable on the shaft 279, and on the downwardly extending portion of such angle member 280 is formed a cam 281 adapted to engage with the rolls 271 and 272 that are rotatably mounted at the free ends of the arms 269 and 270, and when in engagement therewith, are moved into the position to bring the cam surface 281 into its uppermost position. Secured to the angle member 280 and extending inwardly therefrom is the plate member 136 (Figs. 1 and 7) on the inner under face of which is secured, by bolts 283, the cam 135 which, as above described, is adapted to engage with the roller 134 (Figs. 3, 5 and 10) on the arm 133 so as to rotate the link 129 about its pivot point and thus operate the shaft 126, which shaft, in turn, rotates the shaft 100 to control the brake and clutch drum 75.

If the apparatus above described is in the position shown, for example, in Fig. 4, and the operator presses on the foot treadle 258, the shaft 257 will be rotated and the connecting rod 260 will rotate the shaft 250 (Fig. 1) in a clockwise direction, while the connecting rod 262 will rotate the shaft 266 (Fig. 1) in a counterclockwise direction, both as viewed with respect to Fig. 4, whereupon the arm 269 will be moved to the right, with respect to Fig. 4, moving the roller 271 out of engagement with the cam surface 281 on the angle member 280, while, with respect to Fig. 4, the arm 270 (Fig. 1) will be rotated in a counterclockwise direction, moving the roll 272 thereon out of engagement with the cam surface 281 on the angle member 280 located at its side of the table 152. When this occurs, and referring now to Fig. 7, it will be obvious that the angle member 280 will be rotated downwardly about the shaft 279, this rotation taking place because of the weight of the angle member 280 and because of the springs 277. This action will lift the cam 135 upward out of the path of movement of the roller 134 and the arm 129 is free to rotate about its pivot and this rotation will take place due to the tension of the springs 80 (Fig. 10) on the bolts 79, moving the combined brake and clutch member 75 out of engagement with the braking mechanism 73 and into engagement with the clutch member 74, this action moving the shafts 81 and 82 to the right, as viewed in Fig. 10, and rotating the shaft 100 in a counterclockwise direction because of the member 83 engaging with the lower part of the member 102. While both of the rolls 271 and 272 (Fig. 1) have been described as operating so as to release the angle members 280, yet only that angle member 280 shown at the right of Figs. 1 and 7 will cause an operation or permit operation of the shaft 126, shown in Fig. 10, although both of such rollers 271 and 272 permit the springs 277 to force the clamping members 276 into engagement with the top of the table 152 or with any article placed thereon, such for example, as a hide or skin 285.

If the apparatus has operated as just described, then the power will be transmitted from the motor 60 through the brake and clutch drum 75, clutch 74, to the shaft 190 and through a half revolution, at which time, and assuming the operator to have removed his foot from the treadle 158, the cam surface 281 will come into engagement with the rolls 271 and 272 respectively, this action bringing the cams 135 into position to engage with the roll 134, and the proper cam 135 therefore engaging with this roll 134 rotates the arm 129 about its pivot moving the shaft 126 downwardly, with respect to the roll shown in Fig. 10, thereby rotating the shaft 100 and the member 102 engaging with the member 83 will move the shafts 82 and 81 to the left, as shown in Fig. 10, and moving the combined brake and clutch drum 75 out of engagement with the clutch mechanism 74 and into engagement with the braking mechanism 73 and the table 152 will be brought to rest.

It will be noted that, under the conditions assumed, the piston 97 (Fig. 10) is not disturbed in any way, this being more in the nature of a safety device, which may be tripped by the plunger 120 of the solenoid 119 controlled by the operator and returned to position, as shown in Fig. 10, by rotation of the shaft 115.

Secured to the top of the plates 43 on the casing 13 by bolts 296 (Fig. 4) is a member 297, which extends forwardly and terminates above the center of the member 149 (Fig. 6). Formed integrally with the member 297 and extending laterally therefrom at its front end, and extending radially with respect to the member 149, are extensions 298 (Fig. 1). These extensions are in line with each other above the center of the member 149 and at right angles to the member 297. On each side of the casing 13 and secured to the base 10 by bolts 299 are upwardly and forwardly extending supporting members 300 (Figs. 1 to 3, inclusive). The members 300 extend forwardly as far as the rear surface of the members 298 and are secured to such members 298 by bolts 301. Extending between the opposing faces of the members 300 and 297 and secured to each of these members by bolts 302 are braces 303 (Fig. 3). Secured to the inner face of each of the members 300 by bolts 304 are bearing brackets 305 (Fig. 7), each provided with a vertically arranged shaft 306 (Fig. 3)) on which is mounted a member 307. There are thus two of the members 307, one on each of the members 300 and each member 307 (Figs. 1, 2, 3, 6 and 7) has pivotally attached thereto on shaft 308 one end of a link 309. Each of the links 309 is pivotally attached on a shaft 310 secured to and extending upwardly from the reciprocating crosshead 45 (Fig. 6) above described as being slidably mounted on the top of the casing 13. Each of the members 307 is provided at its outer free end with a vertically arranged shaft 311 (Figs. 1 and 3), for a purpose to be hereinafter described and it will be obvious from the above description that, as the shaft 190 rotates, an oscillating movement is imparted to the member 29 (Figs. 6, 10 and 17), and through such member 29 a reciprocating movement is imparted to the crosshead 45. Also, it will be obvious that, with the crosshead 45 reciprocating, an oscillatory motion will be imparted first to the members 307 and that an oscillating movement will be imparted to the shafts 311 carried by the outer ends of the members 307. The purpose of this arrangement will be apparent as the description of the mechanism proceeds.

The members 298 are in alinement with each other and either secured to or formed integrally with the member 297, and from an inspection of Fig. 7, for example, it will be apparent that the members 298 are placed end to end and are composed practically of a single unitary structure. In the members 298, and because of the fact that such members form a single unitary structure, they will be hereinafter referred to as a single element, there is formed adjacent the lower face thereof and in a substantially horizontal plane, opposed spaced V-grooves 312

(Figs. 12 and 18). These V-grooves 312 may be formed in the material of the members 298, or preferably and in order to avoid undue cost of manufacture, such grooves 312 are formed in rectangular bars 313 secured to the bottom face of the member 298 by bolts 314, such rectangular bars being located on opposite sides of a central opening or slot 315 (Fig. 12) formed in the lower face of the members 298. Slidably mounted in the opposed grooves 312 and in each of the single members 298 is a body member 316, the members 316 being provided with laterally outward projecting V-projections 317 for this purpose. Secured to each of the body members 316 by nut 317a is a downwardly extending shaft 318 (Figs. 13 and 18), and at the lower end of each of such shafts is pivotally mounted one end of a link 319, the other end of such links being pivotally attached to the shafts 311 above referred to as being secured to the outer or free ends of the members 307 (Figs. 3 and 7). It will be obvious, therefore, from the above that the oscillating movement of the shafts 311 in the outer or free ends of the members 307 will be imparted to the body members 316 in the form of reciprocating movement thereof due to the action therewith of the shaft 311 by the links 319. There is thus imparted to the body members 316 a reciprocating movement toward and from the center or joining point of the members 298 on the rotation of the shaft 196 and the oscillating motion of the member 29. The body members 316 are identical in construction and the apparatus carried thereby is also identical in construction and operation and, therefore, in the description of the apparatus but one of the body members 316 will be referred to. The body member 316 has secured thereto on its under face and adjacent to the shaft 318 by bolts 320 (Figs. 13 and 18) downwardly depending brackets 321. Rotatably mounted in the lower end of the brackets 321 is a shaft 322. Secured to the shaft 322 by set screw 323 is a member 324. Screwed into the bottom of the body 316 is a stop bolt 325 (Fig. 13), this stop bolt being adapted to be held in adjusted position by means of the check nut 326. Fitting into a hole 327 in the member 324 is a stop plug 328 which is adapted to strike against the stop bolt 325 in the body 316 when the member 324 has been rotated in a counterclockwise direction, as viewed in Fig. 13, the upward movement of the member 324 being thus limited. At the forward end of the member 324 is arranged a shaft 329 (Figs. 12 and 13), this shaft being parallel to the shaft 322, and on such shaft and at each end thereof are secured by bolts 330 the lower end of links 331. Formed on the member 316 are spaced bearings 332 and in these bearings is rotatably mounted a shaft 333 and on such shaft 333 is secured by bolt 334 the upper end of a downwardly depending double link 335. The lower end of the double link 335 is bifurcated, as shown in Fig. 12, and at the end of each furcation is rotatably mounted an inwardly extending stub shaft 336, and to the inner end of each of said shafts is secured, by set screw 337, the upper end of the links 331. At the end of the member 324 remote from the shaft 322 and extending across and in front of the links 331 is a plate 338 and through this plate, at each end thereof, is threaded a bolt 339, a check nut 340 for each bolt maintaining the bolt in adjusted position. The head of the bolt engages with a boss 341 formed on the links 331. The bolts 339 and bosses 341 act to limit the pivotal movement of the links 331 about shaft 329 in one direction.

The links 335 and 331 constitute a toggle for maintaining the free end of the member 324 in its lowermost position and also act as suspension means for such member 324. Formed on the inner portion of the members 298 are inwardly extending brackets 342 (Figs. 12 and 13), there being one of such brackets on either side of the members 316. Secured to each bracket 342 by bolts 343 is a supporting arm 344 and secured to the inner end of each of said arms 344 by screws 345 is a downwardly depending cam member 346 provided on its vertical face with a cam surface 347 (Fig. 13). Formed integral with the link 335 and extending upwardly therefrom is an arm 348 in which is mounted a shaft 349 and on such shaft is rotatably mounted a roller 350 which is adapted to engage with the cam surface 347. As the members 316 move inwardly in the member 298 or toward each other, the rollers 350 will be brought into engagement with the cam surface 347 and will rotate the links 335 on the shafts 333 so as to bring the lower end of such links 335 inward toward each other, as viewed in Fig. 13, thereby rotating the links 331 about their shafts 329 and the upper end of such links 331 will also move inwardly toward each other, as viewed in Fig. 13, until the bosses 340 come into engagement with the heads of the bolts 339 and when this contact occurs the center of the shafts 336 will be out of line with the centers of the shafts 333 and 329 and the links 335 and 331 will be locked or act as a toggle to maintain the free end of the member 324 in its lowermost position. Secured to the arms 348 (Fig. 13) by screws 352 is a buffer trip member 353. Secured to the member 316 by bolts 354 is a frame 355, and secured to such frame 355, by bolts 356, and nuts 357, is a solenoid 358, provided with a plunger armature 359. Threaded into a boss 360 in the member 316 is a post 361, a nut 362 being employed to hold the post 361 firmly in position, and attached to the upper end of such post 361 is one end of a coiled spring 363, the other end of this coiled spring being attached to the plunger armature 359. The spring 363 normally tends to hold the plunger armature 359 in its retracted position or in the position shown in Fig. 13, for example. The line of movement of the plunger armature 359 enables it to engage with the trip buffer 353 and, therefore, when the solenoid 358 is energized, the plunger armature 359 will be moved against the trip buffer 353, thus rotating the associated links 335 about the shaft 333 and through the links 335 and 331, moving the free end of the member 324 upwardly, as viewed in Fig. 13, and for a purpose to be hereinafter described.

Rotatably mounted on the shaft 322 are spaced arms 364, these arms being connected together and spaced apart by an integral transverse web 365. A cup-shaped depression 366 is formed in the transverse web 365 and forms a seat for the lower end of a coiled spring 367. The member 324 is drilled and tapped to receive a threaded sleeve 368 formed adjacent its lower end with a flange 369 and with a cylindrical extension 370 which fits into the upper end of the coiled spring 367, such coiled spring abutting against the flange 369 as an anchor. Passing through a perforation in the transverse web 365 and through the cylindrical member 368 is a bolt 371, the upper end of which is threaded to receive a nut 372. This nut 372 is provided with diametrically arranged projections 373 that fit into corresponding slots in the upper end of the member 368. The above described arrangement constitutes a spring attachment between the member 324 and the arms 364 and the tension of the spring 367 may be varied by the nut 372, which, upon being rotated, will rotate the cylindrical member 368 so as to move the same upwardly or downwardly with respect to the member 324 and thus alter the tension of the spring 367. It should be understood, of course, that the pitch of the threaded portion of the screw 371 is identical with the pitch of the screw on the threaded cylindrical member 368. Formed on each of the arms 364 and extending rearwardly therefrom, as viewed in Fig. 13, are extensions 374 provided with buffers 375, of rubber, fibre, or any other suitable material. Secured to the outer face of each of the downwardly extending brackets 321 by bolts 376 is a plate 377, having formed integrally therewith a cylindrical member 378, drilled to receive with a sliding fit a plunger 379, and a spring 380 is housed between the plunger 379 and the end of the drilled portion in the member 378. The spring 380 tends to force the plunger 379 out of the drilled portion in the member 378 and to keep it constantly in engagement with the buffer 375, thus tending to rotate the member 364, as shown in Fig. 13, about the shaft 322 in a counterclockwise direction. Formed integrally with the arms 364 and extending upwardly therefrom are members 381 (Figs. 12 and 13). Secured to the upper end of each of the members 381 by nut 382 is an outwardly extending stub shaft 383 and rotatably mounted on each stub shaft is a roller 384. Secured to each of the downwardly depending cam members 346 by bolts 385 and extending downwardly and outwardly therefrom, are members 386. Formed on the lower end of such members 386 and on opposite faces thereof, as viewed in Figs. 12 and 13 are cam surfaces 387 (Fig. 13) and these cam surfaces are adapted to be engaged by the rollers 384 that are rotatably mounted at the upper end of the members 381.

If we assume that the members 316 with the attached mechanism above described thereon are separated from each other, and are moving toward each other so as to ultimately reach the position shown in Fig. 13, but before the rolls 350 will have engaged with the cam surfaces 347, then under such assumption the shafts 329 are in their uppermost position because of the fact that the shafts 336 forming the pivot connection between the links 335 and 331 are each moved by springs 380 toward the respective brackets 321 on the member 316 on which the mechanism is mounted. As the members 316 approach each other, the rolls 350 ultimately will be brought into engagement with the cam surface 347 and each of the links 335 will be rotated so as to move the shafts 336 toward each other, as viewed in Fig. 13, thus moving such shafts 336 away from the member 316 on which each is mounted. This movement will result in forcing the shafts 329 downwardly into their lowermost position or until the bosses 341 on the links 331 engage with the head of the bolts 339, and when this engagement occurs the center of the shaft 336 will be to the right (considering the left-hand shaft 336 in Fig. 13) of the line joining the centers of the shafts 333 and 329, thus having the links 335 and 331 to act as a toggle to maintain the shaft 329 in its lowermost position. The arms 364 at the joining point thereof, with the upwardly extending members 381, are provided with arcuate slots 388 in alinement with each other and secured to the free ends of the arms 364 by bolts 389 passing through the arcuate slots 388, is a blade holding frame 390. On the blade holding frame 390 is secured by plate 391, bolts 392, and nuts 393, a blade 394. Each of the blade holding frames 390 is provided, adjacent either end thereof, with a threaded adjusting screw 395 which engages with the upper edge of the blade 394 and is utilized for adjusting the blade 394 in position on the blade holding frame 390 and with respect to the material on the top of the table 152.

Secured in the members 298 in any convenient manner are trip rods 395a, (Figs. 7 and 11) these trip rods being adjustable and adapted to engage with or be engaged by the trip buffer 353 carried by the arms 348 that are formed integrally with the links 335. If we assume that the blades 394 carried by the blade holder frames 390 are in their lowermost position when in the position shown in Fig. 7, for example, and that the members 316 are moving outwardly from the joining point of the frames 298, as viewed in such Fig. 7, it is obvious that the blades 394 will engage with the hide or skin 285 on top of the table 152 and will continue in engagement with such hide or skin during the outward stroke of the blades 394. If the solenoid 358 is not operated to have the plunger 359 thereof engage with the trip 353 (Fig. 13), then such trip 353 will engage with the ends of the rods 395a, whereupon the links 335 will be rotated about their shafts 333 so as to break the toggle above referred to and move the shafts 329 upwardly, thus also moving the blades 394 upwardly out of engagement with the table 152. It will be understood that the rods or stops 395a may be adjusted so as to terminate the operative strokes of the blades at different distances from the center of the table, thereby making possible adjustment for a batch of skins which differs materially in size from the batch just operated on. The members 316 will, therefore, complete their outward stroke without having the blades 394 engage with the table 152 and on the return movement of such members 316 toward the joining point of the members 298, the blades 394 will be held out of engagement with the hide or skin 285 and will continue out of engagement until the following sequence of events takes place. The roll 350 will engage with the cam 347, throwing the shafts 329 and, therefore, the member 324 and arms 364 downwardly. The rolls 384 carried on the arms 381 will engage with the cam surface 387 on the downwardly extending members 386 and the downward movement of the arms 364 will be arrested before the blades 394 come into engagement with the hide or skin 285 on the table 152. This is possible since straightening of the toggle links 331, 335, will result in moving member 324 toward the arms 364 and in compressing the spring 367. The members 316 will now start outwardly from the center or joining point of the frames 298 or away from each other and as they move away, the rolls 384 will ride down and off the cams 387, due to expansion of the spring 367, thus gradually bringing the blades 394 into engagement with the hide or skin 285. By this means I am enabled to have a blade brought into engagement with the hide or skin 285 gradually and, therefore, I have eliminated the shock to the blades 394 when the same would come sharply into engagement with the hide or skin 285 and have preserved the hide or skin 285 from injury due to the striking blow of the blades 394 therewith. Furthermore, the blades 394 are held yieldingly against the work, thus permitting self-adjusting movements of the blades to accommodate variations in the thickness of the work piece being treated.

Secured to the member 298 and on either side thereof are bus bars 396, (Figs. 7, 11, 12, 13 and 18) such bus bars being connected to any convenient source of power and also to a switch 397 (Fig. 4) mounted in an arm 398 secured to the front of the frame member 298 by bolts 399. There are, of course, two of these switches 397 and two of the arms 398 (Fig. 3), one for each of the solenoids 358 (Fig. 13) and, therefore, each solenoid can be controlled separately. The solenoids 358 obtain current from the bus bars 396 through the medium of brushes 400 (Figs. 11 and 18) mounted in carriers 401 that are adjustably secured to posts 402 on the members 316. The operator of the machine, therefore, may allow the blades 394 to sweep over the hide or skin 285 to the full length of the stroke when the links 335 (Fig. 13) are mechanically operated by the rods 395a serving as stops to break the toggles to move the blades 394 up out of engagement with such hide or skin 285, or he may, by operating the switches 397, move the blades 394 up out of engagement with the hide or skin 285 at any point in the stroke and may, as above described, perform this operation on each blade 394 separately. There is also provided on one of the arms 398 a switch (not shown) connected with any suitable source of power and with solenoid 119 (Fig. 10), which controls the safety lever 110 to throw the combined brake and clutch drum 75 out of engagement with the clutch member 74 and into engagement with the brake member 73, this being performed under the influence of the spring 103 (see Fig. 10).

The operation of the machine is as follows, it being assumed that such machine has been constructed as above described and that the parts are in the following positions: The combined brake and clutch member 75 (Fig. 10) is in engagement with the brake member 73. The piston 97 has been forced to its extreme left-hand position, as viewed in Fig. 10, by the spring 103. The arm 102 is also in its extreme left position, as viewed in Fig. 10, because of the fact that the link 129 has been rotated by the engagement of the cam 135 with the roll 134 that is carried in the arm 133. The stroke of the lever 29 (see Fig. 6) has been adjusted by means of the mechanism shown in Fig. 10. The blades 394 (Figs. 7, 13 and 19) have been adjusted to the proper angle and parallel with the table 152 and with respect to the shafts 329 and rolls 384. The Reeves drive, indicated by the numeral 56, has been set to impart the proper speed to the various elements of the machine. The operator will now throw the power into the motor 60, and under these circumstances the gear 65 carrying the clutch member 74 will be continuously rotating. Also, the operator will move the lever 116 (Fig. 1) to rotate the shaft 115, and the member 117 (Fig. 9) thereon will engage with the member 106 (Fig. 10) on the piston rod 98 and will move the piston 97 to the right, as viewed in Fig. 10, against the tension of the spring 103 a sufficient distance to allow the lever 110 to rotate under the influence of the spring 111 and have the end 109 of such lever engage with the member 106, thus locking the piston 97 in its extreme right-hand position, as viewed in Fig. 10. A hide or skin 285 (Fig. 6) is now placed on a cardboard 405 and the cardboard with the skin thereon is placed on the top of the table 152, it being understood that this cardboard 405 is large enough to be under the clamp members 276 (Fig. 1). After positioning the cardboard 405 with the hide or skin 285 thereon, the operator will step on the treadle 258 (Figs. 1 and 5), thus rotating the shaft 257 and causing the links 269 and 270 to move the rolls 271 and 272 respectively out of engagement with the cams 281 on the angle members 280. The members 280 carrying the cams 281 will thereupon rotate on the shafts 279 and move the cam 135, that is carried thereby, out of engagement with the roll 134 on the arm 133 (Figs. 5 and 10). It should be understood that, while both cams 135 have been described as being rotating, only one of them at a time will be in engagement with and control the roll 134 on the arm 133. The arm 133 is carried by the lever or link 129 and such link is free to rotate and will rotate because of the pressure exerted by the springs 80 associated with the combined brake and clutch member 75. Such springs will force the combined brake and clutch member 75 out of engagement with the brake member 73 and into engagement with the clutch member 74 and will also move the shafts 81 and 82 to the right, as viewed in Fig. 10, and the end 83 of the shaft 82 will engage with the arm 102, moving the same to the right and thus rotating the shaft 100, to which the arm 123 is attached, and the arm 123 will move the shaft 126 longitudinally and will thus rotate the lever 129. Power is thus transmitted from the gear 65 which, it will be remembered, is constantly rotating under the influence of the motor 60, and from said gear through the combined brake and clutch member 75 to the train of gears 89, 90, 92a and 19, and from said train of gears to the member 21. The member 21 rotating will cause an oscillating movement of the lever 29 (Fig. 6) and, therefore, a reciprocating motion on the part of the member 45. The member 45 reciprocating will cause an oscillating movement of the arms 307 and, therefore, a reciprocating movement of the members 316 (Fig. 7) in the members 298. As above described the blades 394 carried by the members 316 will, in their outward movement away from each other as viewed in Fig. 7, be in engagement with the hide or skin 285 (Fig. 6) on the cardboard 405 resting on the table 152, and in their reciprocating motion toward each other, as viewed in Fig. 7, such blades 394 will be held up out of engagement with the hide or skin 285. Such engagement and disengagement of the blades 394 and the manner in which the same may be either manually or electrically controlled have been described above and need not be here repeated. As the members 280 rotate with the table 152, due to the operation of the treadle 258, the upper surface of each member 280 allows a downward movement of the work clamping members 276, carried on the shafts 275 (Fig. 4), under the influence of the springs 277. The clamps 276 therefore are brought into position to hold the cardboard 405 firmly, though resiliently, in position on the top of the table 152. When the members 316 have reached their outermost position with respect to each other and the blades 394 have been lifted upwardly from the hide or skin 285, the mechanism shown in Figs. 5, 15 and 16 operates, first, to move the tapered end 165 of the plunger 164 out of the tapered holes 161 in the index plate 160 and the plunger 195 moves upwardly to have the rectangular portion 196 at the upper end thereof engage with one of the depressions 197 in the bottom face of the index plate 160 and through the rod 209 and lever 226 (Fig. 5), controlled by the cam 230, a rotary movement is imparted to the table 152, the amount of angular movement of such table being determined by the rotating mechanism just referred to and when the rotating movement is ended, the tapered end 165 of the plunger 164 engages with the next succeeding tapered depression 161 in the index plate 160. This rotative movement on the part of the table 152 takes place during the inward idle movement or stroke of the members 316 and the table 152 is maintained stationary during the outward working movement of said member 316, at which time the blades 394 are in engagement with the hide or skin 285. This rotative movement of the table 152 is intermittent and proceeds regularly for a half revolution of the table 152, at which time the cams 135 carried by the members 280 engage with the roll 134 on the arm 133 (Fig. 10) and such engagement causes a rotative movement of the link 129, and, therefore, a rotative movement of the shaft 100, which in turn moves the arm 102 thereon to the left, as viewed in Fig. 10, causing a longitudinal movement of the shafts 82 and 81 and a movement of the combined brake and clutch member 75 away from the clutch member 74 and into engagement with the brake member 73, thus bringing the machine to rest although still allowing the gear 65 to continuously rotate.

A hide or skin may be completely slicked or set out in the number of strokes necessary to rotate the table 152 through a half revolution, although it is to be understood that the operator may again bring the device into operation by merely depressing the foot treadle 258. The hide or skin, however, having been satisfactorily slicked, the cardboard 405 with the now slicked hide 285 thereon is removed from the table 152 and another cardboard 405 with an unslicked skin 285 is placed in position and the above sequence of operations is repeated.

The operator having placed a hide or skin 285 in position on a cardboard 405 and the cardboard in position on the table 152, may allow the device to function mechanically. Due, however, to the fact that the hides or skins 285 are unequal in size and are usually of substantially rectangular form, some of the strokes of the blades 394 are too long for the surface being operated upon, or the condition of the hide or skin 285 is such that the operator does not want the blades 394 to touch a particular portion thereof. The operator, therefore, by proper manipulation of the switches 397 in the arms 398, may control one or the other or both of the holding devices for the blades 394 and move such blades up out of engagement with the hide or skin 285 at any point in the outward stroke of the members 316. Also, the operator may stop the machine instantly at any time by controlling the circuit for the solenoid 119 (Fig. 10), and assuming that such solenoid is controlled, the plunger armature 120 thereof will be moved against the tension of the spring 121 associated therewith and will strike against the outer end of the lever 110. Such lever rotating will move the member 109 thereof out of engagement with the member 106 on the piston rod 98 and allow the spring 103 to move the piston 97 to the left, as viewed in Fig. 10, thus imparting a longitudinal movement to the shafts 82 and 81 and moving the combined brake and clutch member 75 out of engagement with the clutch member 74 and into engagement with the brake member 73.

Having described my invention, what I claim as new and desire to secure by Letters Patent of the United States is:

1. In a machine for operating upon hides, skins, and leather, a work supporting member, a plurality of tools movable in opposite directions for operating on the work while the latter is supported by said member, a supporting member for the tools, and power means controlled by one of said members to rotate one of said members through an arc of 180° and then to terminate such rotation, whereby all portions of the work will have been operated upon by the oppositely moving tools during such rotation of one of said members through 180°.

2. In a machine for operating upon hides, skins, and leather, a work supporting member, a plurality of tools movable in opposite directions for operating on the work while the latter is supported by said member, carriers for the tools guided to move in straight lines in a plane above the work supporting member, a supporting member for the tool carriers, and power means controlled by one of said members to rotate one of said members through an arc of 180°, step by step in the intervals between operative strokes of the tools, and then to terminate such rotation, whereby all portions of the work will have been operated upon by the oppositely moving tools during such rotation of one of said members through 180°.

3. In a machine for operating upon hides, skins, and leather, a work supporting table, a plurality of tools movable in opposite directions over the upper surface of the work supporting table from points at or adjacent to central parts of the work supported on said table, carriers for the tools guided to move in straight lines in a plane above the table, and power means controlled by the table to rotate said work supporting table through an arc of 180° and then to terminate such rotation, whereby all portions of the work will have been operated upon by the oppositely moving tools during the rotation of the table through 180°.

4. In a machine for operating upon hides, skins, and leather, a table for supporting a hide or skin to be operated upon, a plurality of tools for operating on a hide or skin on the table, means to cause operation of the tools from a central portion of the table outwardly to marginal portions thereof and to cause the tools to be lifted from the table during their return stroke, power means timed to rotate the table step by step in the intervals between operative strokes of the tools, and means to lock the table against rotative movement during the operative stroke of the tools.

5. In a machine for operating upon hides, skins, and leather, a table for supporting a hide or skin to be operated upon, a plurality of tools for operating on a hide or skin on the table, means to cause operation of the tools simultaneously in opposite directions from a central portion of the table outwardly to marginal portions thereof and to cause the tools to be lifted from the table during their return stroke, power means timed to rotate the table, through an arc of 180°, step by step in the intervals between operative strokes of the tools, a member supported by said table to initiate termination of the operation of said power means after rotation of said table through 180°, and a manually operable member to control said table-supported member.

6. In a machine for operating upon hides, skins, and leather, a table for supporting a hide or skin, a tool movable from a central part of the table to operate on portions of the hide or skin as the tool moves in an outward direction over the table, means to cause the tool to operate on the hide or skin during its travel away from the central part of the table and to return idly to initial position over the central part of the table, power means timed to rotate the table step by step while the tool is returning idly to initial position, a manually operable member to initiate operation of said table rotating means, and a member carried by the table to terminate the operation of said table rotating means at a predetermined point in its revolution.

7. In a slicking machine, a table for supporting a hide or skin, a pair of slicker blades movable in opposite directions from a central part of the table to put out portions of the hide or skin as the blades move outwardly over the table, means to cause the blades to operate on the hide or skin during their travel away from each other and to return idly to initial position over the central part of the table, power means timed to rotate the table step by step while the blades are returning idly to initial position, a treadle mechanism to initiate operation of said table rotating means, and means automatically operative to terminate the operation of said table rotating means at the end of a half revolution of the table.

8. In a slicking machine, the combination of a table, means for rotating said table step by step through a half revolution, means for clamping sheet material thereon, means for releasing said clamping means as the table completes its rotary movement, and a slicking blade co-operating with said table and movable transversely thereof to treat said sheet material.

9. In a slicking machine, the combination of a table, means for rotating said table step by step through a half revolution, a carrier movable transversely of said table, a slicking blade mounted on said carrier to operate on a piece of work on said table during movement of the carrier in one direction, means for moving said carrier in timed relation with the movement of the table, and means under the control of the operator to terminate the operation of said tool on the work at any selected point in its operative stroke.

10. In a slicking machine, the combination of a table adapted to hold a hide or skin in working position, means for rotating said table in a horizontal plane by a step by step movement, clamping devices on said table, means for operating said clamping devices to clamp the hide or skin on the table upon the initiation of movement to the table, and means for automatically releasing said clamping devices when the table has rotated through a predetermined amount.

11. In a machine for operating upon hides, skins, leather, and like pieces of work, a plurality of tools movable to perform slicking operations on a piece of work, a work support, said work support and tools being relatively rotatable to operate upon successive portions of the work, work clamping members carried by the work support to keep the work in clamped relation to the work support, power means for effecting the said relative rotative movement of the tools and the work support, and means associated with the work clamping members to control said power means in initiating and terminating the said relative movement of the work support and tools by said power means.

12. In a machine for operating upon hides, skins, leather, and like pieces of work, a plurality of tools movable to perform operations on a piece of work, a work support, said work support and tools being relatively rotatable to operate upon successive portions of the work, work clamping members carried by the work support to keep the work in clamped relation to the work support, power means for effecting the said relative rotative movement of the tools and the work support, cam members associated with the work clamping members, and a manually operable member having connections to initiate movement of the work clamping members to operative position and simultaneously therewith movement of the cam members to initiate relative rotation of the work support and tools by said power means.

13. In a slicking machine, a plurality of slicking tools movable in opposite directions to perform slicking operations on a piece of sheet-like work, a work support, said work support and tools being relatively rotatable to operate upon successive portions of the work, work clamping members carried by the work support to keep the work in clamped relation to the work support, power means for effecting the said relative rotative movement of the tools and the work support, cam members associated with the work clamping members, and treadle mechanism having connections to initiate movement of the work clamping means to operative position and simultaneously therewith movement of the cam members to initiate relative rotation of the work support and the tools by said power means, one of said cam members being operable to terminate operation of said power means at a predetermined point in said relative movement of the work support and tools.

14. In a machine for operating upon hides, skins, leather, and like pieces of work, a plurality of tools movable to perform operations on a piece of work, a work support movable to present successive portions of the work to the tools, work clamping members carried by the work support and movable therewith to keep the work in clamped relation to the work support, power means for moving the work support, and a treadle mechanism having connections to initiate work clamping operation of the work clamping members and power movement of the work support.

15. In a machine for operating upon hides, skins, leather, and like pieces of work, a plurality of tools movable to perform operations on a piece of work, a work support movable to present successive portions of the work to the tools, work clamping members carried by the work support and movable therewith to keep the work in clamped relation to the work support, power means for moving the work support, cam members associated with the work clamping members, and a treadle mechanism having connections to initiate movement of the work clamping means to operative position and simultaneously therewith movement of the cam members to initiate power operation of the work support.

16. In a machine for operating upon hides, skins, leather, and like pieces of work, a table for supporting a hide or skin, a pair of tools movable in opposite directions from a central part of the table to treat portions of the hide or skin as the tools move outwardly over the table, means to cause the tools to operate on the hide or skin during their travel away from each other and to return idly to initial position over the central part of the table, power means timed to rotate the table step by step while the tools are returning idly to initial position, a treadle mechanism for initiating operation of said means, two work clamping members carried by the table and located diametrically opposite each other, and cam members associated with the work clamping members and automatically operative to terminate operation of the table rotating means at each half revolution of the latter.

17. In a machine for performing operations on hides and skins and other similar pieces of work, a work support, a tool for operating on a piece of work backed by the work support, means to move the tool over the surface of the work in operations thereon, means comprising spring means to move the tool yieldingly toward the work on the support at the beginning of said operations, and means arranged to resist said spring means and to lower said tool gradually into contact with the work.

18. In a machine for performing operations on hides and skins and other similar pieces of work, a work support, a blade for operating on a piece of work backed by the work support, a carrier for the blade, means for moving the carrier to cause the blade to move in a path over the surface of the work, means to move the blade in a direction toward the work, and a stationary cam operative to moderate the speed of movement of the blade into contact with the work at the beginning of the operative stroke of the blade.

19. In a slicking machine, a work support for a hide or skin undergoing treatment, a slicker blade adapted to perform putting-out operations on a hide or skin, a carrier for the blade, a toggle to press the blade into contact with the hide or skin, means to move the carrier to draw the blade over the hide or skin to effect slicking operations thereon, and means to break the toggle at a predetermined point in the outward movement of the carrier to terminate the slicking operation and to permit the slicker blade to be returned idly to its initial position.

20. In a slicking machine, a work support for a hide or skin undergoing treatment, a slicker blade adapted to perform putting-out operations on a hide or skin, a carrier for the blade, a toggle connected to the blade and to the carrier, means to straighten the toggle to move the blade toward the hide or skin on the work support, means to lower the slicker blade gradually into contact with the work as the blade starts on its operative stroke, and means to move the carrier to draw the blade over the hide or skin to effect slicking operations thereon.

21. In a machine for operating upon hides, skins, and leather, a work support for a hide or skin undergoing treatment, a tool adapted to perform operations on a hide or skin, a carrier for the tool, a toggle connected to the tool and to the carrier, means to straighten the toggle to move the tool toward the hide or skin, a stationary cam to lower the tool gradually into contact with the hide or skin as the tool starts on its operative stroke, and means to move the carrier to draw the tool over the work to effect treatment thereof.

22. In a machine for performing operations on hides and skins and other similar pieces of work, a work support, a plurality of tools for operating on a piece of work backed by the work support, means for moving the tools in opposite directions over the surface of the work in operations thereon, means operative to move the tools in a direction toward the work on the support, and a cam member having cam surfaces to lower the tools gradually into contact with the work on the support at the beginning of said operations.

23. In a machine for performing operations on hides and skins and other similar pieces of work, a work support, a plurality of tools for operating on a piece of work backed by the work support, a carrier for each tool, means for moving the carriers to cause the tools to move in different paths over the surface of the work, a tool supporting member movably mounted on each carrier, a toggle associated with each tool, spring means between the toggle and the tool supporting member, means to straighten the toggles thereby placing said spring means under compression, and cam means associated with the tool supporting members to lower the latter gradually to bring the tools into contact with the work at the beginning of operations thereon.

24. In a machine for performing operations on hides and skins and other similar pieces of work, a work support, a tool for operating on a piece of work backed by the work support, a carrier for the tool, means for moving the carrier to cause the tool to move in a path over the surface of the work, a toggle connected to the tool, means located at the inner end of the idle stroke of the tool to straighten the toggle to move the latter toward the work, and means to break the toggle to cause lifting of the tool away from the work at the end of the operative stroke of the latter.

25. In a machine for performing operations on hides and skins and other similar pieces of work, a work support, a tool for operating on a piece of work backed by the work support, a carrier for the tool, means for moving the carrier to cause the tool to move in a path over the surface of the work, a toggle connected to the tool, a stop located at the inner end of the idle stroke of the tool to straighten the toggle to bring the tool into contact with the work, and a stop located in the path of the carrier to break the toggle to cause lifting of the tool away from the work at the end of the operative stroke of the latter.

26. In a machine for performing operations on hides and skins and other similar pieces of work, a work support, a tool for operating on a piece of work backed by the work support, a carrier for the tool, means for moving the carrier to cause the tool to move in a path over the surface of the work, a toggle connected to the tool, a cam located at the inner end of the idle stroke of the tool to straighten the toggle to bring the tool into contact with the work, a stop located in the path of the carrier to break the toggle to cause lifting of the tool away from the work at the end of the operative stroke of the latter, said stop being operative at a predetermined point in the outward movement of the tool, and means movable with the carrier and under the control of the operator to break the toggle at any point in the outward stroke of the tool, thereby to terminate the treatment at any desired point on the work.

27. In a machine for performing operations on hides and skins and other similar pieces of work, a work support, a tool for operating on a piece of work backed by the work support, a carrier for the tool, means for moving the carrier to cause the tool to move in a path over the surface of the work, a toggle connected to the tool, a stop located at the inner end of the idle stroke of the tool to straighten the toggle to bring the tool into contact with the work, a stop located in the path of the carrier to break the toggle to cause lifting of the tool away from the work at the end of the operative stroke of the latter, said stop being operative at a predetermined point in the outward movement of the tool, and an electrically controlled plunger movable with the tool carrier and operative at the will of the operator to break the toggle thereby to terminate the operation of the tool at any desired point in its operative stroke.

28. In a slicking machine comprising a source of continuous power, and having a work holding table mounted for step-by-step rotary movement in a horizontal plane, slicking devices associated with said table, a clutching device interposed between the source of power and the table, manually operable mechanical means for said clutch for connecting the source of power to the table, and also automatically operable mechanical means for the clutch for disconnecting the source of power from the table after the table has rotated through a predetermined angle, the improvement which comprises an electrically controlled means for said clutch for disconnecting the source of power from the table at any time during the operation of the device.

WALLACE C. WRIGHT.